US011048768B1

(12) United States Patent
Kolbert et al.

(10) Patent No.: US 11,048,768 B1
(45) Date of Patent: Jun. 29, 2021

(54) SOCIAL NETWORKING SYSTEM WITH TRADING OF ELECTRONIC BUSINESS CARDS

(71) Applicants: William Kolbert, Brooklyn, NY (US); Neil Ferraiuolo, Brooklyn, NY (US); Nathan Torda, Brooklyn, NY (US)

(72) Inventors: William Kolbert, Brooklyn, NY (US); Neil Ferraiuolo, Brooklyn, NY (US); Nathan Torda, Brooklyn, NY (US)

( * ) Notice: Subject to any disclaimer, the term of this patent is extended or adjusted under 35 U.S.C. 154(b) by 0 days.

(21) Appl. No.: 16/403,169

(22) Filed: May 3, 2019

(51) Int. Cl.
*G06F 16/9535* (2019.01)
*G06F 16/9536* (2019.01)
*G06Q 50/00* (2012.01)
*H04L 12/58* (2006.01)

(52) U.S. Cl.
CPC ...... *G06F 16/9535* (2019.01); *G06F 16/9536* (2019.01); *G06Q 50/01* (2013.01); *H04L 51/046* (2013.01); *H04L 51/32* (2013.01)

(58) Field of Classification Search
CPC .......... G06Q 10/063112; G06Q 50/01; G06Q 10/06; G06F 16/9535; H04L 51/046
USPC ....................................................... 709/206
See application file for complete search history.

(56) References Cited

U.S. PATENT DOCUMENTS

| 7,516,409 B2 | 4/2009 | Zaner et al. ................ 715/751 |
| 7,921,167 B2 | 4/2011 | Shroff et al. ................ 709/206 |
| 8,386,564 B2 | 2/2013 | Pennington .................. 709/204 |
| 8,793,255 B1* | 7/2014 | Bilinski ................. G06N 20/00 707/740 |
| 8,812,690 B1* | 8/2014 | Ramesh ................ G06Q 10/10 709/227 |
| 9,009,321 B2 | 4/2015 | Alperovitch et al. ........ 709/226 |
| 9,135,294 B2 | 9/2015 | Ghosh et al. .......... G06Q 30/02 |
| 9,380,073 B2 | 6/2016 | Zent et al. ............. H04L 63/20 |
| 9,530,112 B2 | 12/2016 | Friedlander et al. ........................ G06Q 10/0639 |
| 9,625,344 B2 | 4/2017 | Etheredge et al. ... F15B 13/044 |
| 2006/0009994 A1 | 1/2006 | Hogg et al. ................... 705/319 |
| 2006/0042483 A1* | 3/2006 | Work ................ G06F 16/24578 101/91 |
| 2006/0190557 A1 | 8/2006 | Bhogal et al. ................ 709/217 |
| 2013/0085870 A1 | 4/2013 | Seah .......................... 705/14.72 |
| 2013/0290420 A1* | 10/2013 | Work ................... G06F 16/248 709/204 |

(Continued)

OTHER PUBLICATIONS

Wu, Chunchun, et al. "EndorTrust: An endorsement-based reputation system for trustworthy and heterogeneous crowdsourcing." Global Communications Conference (GLOBECOM), 2015 IEEE.

(Continued)

*Primary Examiner* — Mahran Y Abu Roumi
(74) *Attorney, Agent, or Firm* — Venable LLP

(57) ABSTRACT

A social networking system in which electronic business cards are traded as a format for social networking so as to provide for a better measure of social network relationships based on network significance and/or reputation score. Endorsement paths and/or card paths, resulting from trades, may be generated and visualized, and network significance and/or reputation score may be calculated at a given moment in time, or over a specific sub-network of users, such as by being calculated automatically at an interval of time or based on user action.

37 Claims, 17 Drawing Sheets

(56) References Cited

U.S. PATENT DOCUMENTS

| | | | |
|---|---|---|---|
| 2013/0304900 A1* | 11/2013 | Trabelsi | H04L 67/1057 709/224 |
| 2014/0089322 A1 | 3/2014 | Garcia et al. | 707/748 |
| 2014/0129464 A1* | 5/2014 | Grayevsky | G06Q 10/1053 705/321 |
| 2014/0316872 A1* | 10/2014 | Lee | G06Q 30/0276 705/14.16 |
| 2015/0026193 A1 | 1/2015 | Ramesh et al. | 707/748 |
| 2015/0100683 A1* | 4/2015 | Chung | G06Q 50/01 709/224 |
| 2015/0101008 A1 | 4/2015 | Zent et al. | H04L 63/20 |
| 2015/0269530 A1* | 9/2015 | Work | G06Q 50/01 705/319 |
| 2016/0055597 A1 | 2/2016 | Berson et al. | 705/319 |
| 2016/0063442 A1* | 3/2016 | Bennett | G06Q 10/1053 705/319 |
| 2016/0124956 A1* | 5/2016 | Conover | H04W 4/21 707/748 |
| 2016/0232242 A1 | 8/2016 | Friscia et al. | G06F 16/9535 |
| 2017/0039502 A1* | 2/2017 | Guman | G16H 10/60 |
| 2018/0089609 A1* | 3/2018 | Chen | G06Q 10/063112 |
| 2018/0144304 A1* | 5/2018 | Kenthapadi | G06Q 10/103 |
| 2018/0146065 A1* | 5/2018 | Kenthapadi | G06Q 10/105 |
| 2018/0174106 A1 | 6/2018 | Kenthapadi et al. | G06Q 10/1053 |
| 2018/0191717 A1* | 7/2018 | Rajagopal | H04W 12/06 |
| 2018/0295207 A1* | 10/2018 | Mathur | G06F 16/437 |
| 2019/0199594 A1* | 6/2019 | Chiocchi | H04L 41/12 |
| 2019/0391845 A1* | 12/2019 | Gasser | G06F 9/4881 |
| 2020/0042211 A1* | 2/2020 | Rogulenko | G06F 3/0631 |

OTHER PUBLICATIONS

Hendrikx, Ferry, Kris Bubendorfer, and Ryan Chard. "Reputation systems: A survey and taxonomy." Journal of Parallel and Distributed Computing 75 (2015): 184-197.

* cited by examiner

SOCIAL NETWORKING SYSTEM WITH TRADING OF ELECTRONIC BUSINESS CARDS

FIELD

The present disclosure generally relates to evaluating reputations of users in a social networking environment based on online and offline networking.

BACKGROUND

Assessing reputation is often helpful in personal and professional situations, such as when meeting new people or hiring an employee. Reputation provides a means to establish trust between two parties, which is especially helpful when two parties are unacquainted.

Recommendations are a source of trusted reputation information, especially when the person making the recommendation is known. Recommendations from peers, friends, and family tend to be trusted because they come from sources who are known and trusted. In effect, the reputation of the recommender is used to weight the recommendation.

The concept of recommendation has extended to online social networking environments in the form of reputation systems, certain of which allow users to rate, comment on, or otherwise endorse individuals, products, or services. The purpose of a reputation system is to build trust between members of an online community, allowing users to make connections and share information with confidence. Certain reputation systems involve calculating a reputation score that allows unacquainted users to be compared.

Online social network reputation systems suffer from the drawback that users often have limited prior experience with and knowledge of other people in the community, which means it can be difficult to know if endorsements made by other users should be trusted. This also means that it can be difficult to know if reputation scores based on endorsements should be trusted.

Additionally, online social network reputation systems suffer from the drawback that most users conduct networking both online and offline.

For these reasons, there exists a need for an integrated platform that accounts for both online and offline networking actions, allows users to make trustworthy endorsements, and evaluates reputation based on the paths of endorsements over time and across devices. The present disclosure addresses this need.

SUMMARY

In one aspect, there is disclosed generation of endorsement paths in a social network (and visualization thereof), more specifically, generating visualization of the path of an endorsement (or card) throughout a social network, and storing the unique set of users for each path.

According to this aspect, endorsement paths are generated in a social networking environment, by storing a plurality of networking actions between members of a social networking system in a memory, wherein networking actions include connections and endorsements, wherein each endorsement is stored with a timestamp, a subject user, a sending user, and one or more receiving users, wherein the receiving users are those to whom the endorsement is made visible; receiving request to generate set of endorsement paths for a target member of the social network; searching networking actions to retrieve set of receiving users who received endorsements in which the target user is the subject; analyzing plurality of networking actions involving receiving users and target member to generate endorsement paths for target member, wherein each endorsement path is a unique set of users who have received or sent endorsements of the target member to one another sequentially, wherein timestamp data is processed to determine sequence; and storing endorsement paths in a second memory location.

In some embodiments according to this aspect, a request is received to calculate endorsement distance between a first and second member of the social network, wherein the request may be initiated on behalf of a searching member to calculate distance between searching member and a target member. Endorsement paths for each of the first and second members may be generated, and an endorsement distance score may be determined, based in part on the number and/or lengths of endorsement paths of each member that include the other member, and/or based in part on the number of endorsement paths of each member that include Nth-degree connections of the other member. A display profile may be generated for a target user, wherein the display profile includes a visualization of the endorsement paths of target user, such as a visualization of the endorsement paths of a target user as a node graph, wherein each node represents a user and each arm represents an endorsement sent from one user to another, wherein each arm includes a time indicator, and/or such as multiple visualizations of a node graph, wherein each visualization includes endorsement paths involving endorsements that were made during a given time period, wherein the graph is interactive and may display different visualizations based on time period selection input.

In a further aspect, there is disclosed generation of a visualization of card paths in a social network, whereby objects can be traded amongst users of a social network, such as electronic business cards. Trading of cards as a format for social networking provides for a better measure of social network relationships based on recommendations and/or reputation score which may be calculated at a given moment in time, such as by being calculated automatically at an interval of time or based on a user action.

In some embodiments according to this aspect, card paths are tracked in a social networking environment, by storing a plurality of electronic trading cards associated with members of a social networking system, wherein the electronic trading cards are created by members; providing an interface for users to create electronic trading cards; storing a collection of electronic trading cards associated with each member of a social networking system, wherein the collection represents electronic trading cards that have been collected by the member; providing an interface for users to share collected electronic trading cards with other users; tracking electronic cards as they travel through the social networking system, wherein tracking data includes sequential information.

In some embodiments according to this aspect, a request is received to calculate network significance for target electronic trading card; a set is identified of users who have received target electronic trading card; and a network significance score is calculated for target electronic trading card, based in part on analyzing the set of users who have received target electronic trading card. The analysis of the set of users who have received target electronic trading card may include analyzing network significance and/or reputation data of set of users who have received target electronic trading card.

Distinct card paths may be tracked, wherein each card path consists of a unique set of users who have passed along a card sequentially, and a network significance score may be computed for target electronic trading card, based in part on analysis of card paths of target electronic trading card.

In a further aspect, there is disclosed generation of a network significance score using analysis of endorsement recipients and calculation of reputation score based on network significance.

According to this aspect, a reputation score is generated in a networking environment, by storing a plurality of networking actions, wherein the networking actions include connections and endorsements, wherein each endorsement has a subject user, a sending user, and one or more receiving users, wherein the receiving users are those to whom the endorsement is made visible; receiving request to calculate network significance score for target member; analyzing the plurality of networking actions to identify all endorsements in which target member is the subject; retrieving data on receiving user or users for each endorsement in which target user is the subject, wherein data includes network significance of receiving user(s); and computing network significance score for target member based in part on analysis of network of users who have received endorsements of target user.

In some embodiments according to this aspect, to compute a network significance score, data is retrieved on sending user or users for each endorsement in which target user is the subject, wherein data includes network significance; reputation is compared of sending and receiving user to compute a reputation differential score for each endorsement; and network significance score is computed for target member based in part on analysis of reputation differential scores for each endorsement of target user. The receiving user data may include reputation of the members who have received endorsements of target member. Likewise, to compute a network significance score, endorsements are identified where a target user is the sending user; data is retrieved on receiving user or users for each endorsement where target user is the sending user; endorsements made by target user and receiving user data are analyzed; and network significance score is computed for target member based in part on analysis of the reputation of users who have received endorsements sent by user. Likewise, to compute a network significance score, endorsements are identified where target user is the sending user; data is retrieved on subject user for each endorsement where target user is the sending user; endorsements made by target user and subject user data are analyzed, and network significance score is calculated based in part on analysis of the reputation of users who have been the subject of endorsements sent by target user. Likewise, to compute a network significance score, endorsements are identified where target user is the receiving user; data is retrieved on subject user for each endorsement where target user is the receiving user; endorsements received by target user and subject user data are analyzed; and network significance score is calculated based in part on the reputation of users who have been subjects of endorsements received by target user. Likewise, to compute a network significance score, endorsements are identified where target user is the receiving user; data is retrieved on sending users for each endorsement where target user is the receiving user; endorsements received by target user and sending user data are analyzed; and network significance score is calculated based in part on the reputation of users who have sent endorsements received by target user. Likewise, to compute a network significance score, a plurality of networking actions are analyzed involving target member to generate endorsement paths for target member, wherein each endorsement path is a unique set of users who have received and sent endorsements of the target member to one another sequentially; and network significance score is calculated based in part on the endorsement paths for target member. Likewise, a network significance score may be calculated for target user based in part on the length and number of endorsement paths of target member.

In some embodiments according to this aspect, an endorsement path network significance score may be determined, such as by analyzing aggregate network significance of members, by analyzing speed of endorsements that comprise each endorsement path, and/or by analyzing networking behavior of members of each target user endorsement path.

In some embodiments according to this aspect, an endorsement path diversity may be determined, wherein endorsement path diversity includes analysis of how similar and closely related are members of each endorsement path, and wherein network significance score is calculated for target user based in part on endorsement path diversity.

In some embodiments according to this aspect, a reputation score may be calculated for target user based on an analysis of reputation metrics, wherein reputation metrics include metrics derived from an analysis of target user network significance, wherein target user network significance includes at least analysis of recipients of endorsements of target user. Additional reputation metrics may include one of: project success metrics, feedback metrics, performance review metrics, skills, experiences, and/or organizational hierarchy. A graphical interface may be provided for users to create custom reputation score configurations by selecting which of a plurality of reputation metrics to include and adjusting the relative weight of the plurality of selected reputation metrics. Preset reputation configurations may be provided from which the user may choose, or may be provided as a default or generated and saved by users, or may correspond to specific business inquiries.

In some embodiments according to this aspect, target users may be ranked according to calculation of reputation score for each user in a target group. A graphical interface may be provided for users to designate and calculate multiple scores for each user and to compare rankings based on multiple scores.

In some embodiments according to this aspect, contextual data may be stored along with each networking action, wherein contextual data includes reputation score of sending, subject, and receiving users at time of transaction, and a network significance score may be calculated for target user based in part on analysis of historical contextual data of each networking action involving target user. The contextual data may include whether or not users were connected at time of trade.

The network significance and/or reputation score may be calculated for a target user automatically at a given interval of time, and/or automatically based on trigger actions such as a new endorsement being made.

In some embodiments according to this aspect, a plurality of user profiles may be stored wherein each user profile has an associated network significance and/or reputation score; social network may be monitored constantly to identify new connections and endorsements, wherein endorsements have sending, receiving, and subject user; and network significance and/or reputation score may be updated for subject, sending, and receiving user using analysis of new networking actions and reputation rules, wherein the reputation rules define metrics and methods for calculating reputation. Networking actions may include virtual networking actions and virtual representations of real world networking actions.

In a further aspect, there is disclosed calculation of network significance within a time-specific subnetwork, wherein endorsement visibility may be used.

According to this aspect, network significance is calculated within a time-specific subnetwork of a social networking environment, by storing a plurality of networking actions, wherein the networking actions include connections and endorsements, wherein each endorsement has a timestamp, a subject user, a sending user, and one or more receiving users, wherein the receiving users are those to whom the endorsement is made visible; providing visual interface for users to enter time-specific subnetwork network significance search query, wherein search query includes selecting target user or users, target population of users, time period, and number and relative weight of network significance metrics; processing time-specific subnetwork network significance search query to search for all social networking actions involving target users and target population that occurred within given time period; analyzing retrieved social networking actions to determine which actions to ignore, wherein determination is based on whether networking action is not relevant to the reputation of target users; storing set of relevant networking actions in a memory location; retrieving data on users involved in relevant networking actions, wherein users include recipients of endorsements in which target user is the subject; and computing time-specific subnetwork network significance score for target user or users, wherein computation is based in part on analysis of selected network significance metrics.

In some embodiments according to this aspect, the time-specific subnetwork network significance score may include analysis of network significance of users who have received endorsements of target user within the given time period, and data retrieved for users involved in relevant networking actions may include current reputation data of users. Network significance metrics may include at least one of: collective influence of users to whom endorsements of target user have been made visible, collective influence of users to whom target user has made endorsements visible, collective influence of subjects of endorsements made by target user, collective influence of subjects of endorsements made visible to target user, or collective influence of users who have made endorsements visible to target user. Endorsement paths may be generated for all endorsements that are part of the set of relevant networking actions, and the time-specific network significance score may be calculated based in part on analysis of generated endorsement paths.

In some embodiments according to this aspect, a visual interface may be provided for users to enter time-specific subnetwork reputation search query, wherein reputation search query includes selecting target user or users, target population of users, time period, number and relative weight of network significance metrics, and number and relative weight of reputation metrics; and the time-specific subnetwork reputation score may be calculated for target user or users, wherein computation is based in part on analysis of selected reputation metrics.

A graphical interface may be provided if more than one target user is selected, to display ranking of users based on customized time-specific subnetwork network significance score configuration; and an interface may be provided for users to adjust composition and weighting of network significance metrics after generating a ranking of users, wherein the ranking of users is updated automatically based on changes to the network significance score configuration, and/or for users to adjust composition and weighting of reputation metrics after generating a ranking of users, wherein the ranking of users is updated automatically based on changes to the reputation score configuration.

In a further aspect, these is disclosed a regulating effect for regulating social network profile visibility, such as based on user category (which typically is unique in that users do not need to be known to the profile owner in order to fit a given category), wherein endorsement paths may be used to regulate visibility.

According to this aspect, social network profile visibility is regulated, by storing a plurality of networking actions, wherein the networking actions include connections and endorsements, wherein each endorsement has a subject user, a sending user, and one or more receiving users, wherein the receiving users are those to whom the endorsement is made visible; storing a plurality of social network sub-profiles associated with users, each with associated visibility settings; providing an interface for users to create sub-profiles, wherein each sub-profile includes a set of profile elements to display and has associated visibility settings, wherein visibility settings define a given level of access for a given category of users with certain attributes; receiving a request by a searching user to access a target user's social network profile, wherein the searching user is a member of the social network; determining if searching user attributes match the visibility profile of any of target user's sub-profiles; retrieving from a central server the sub-profile or sub-profiles that match the category of searching user, determining which sub-profile to display based on priority rules (if more than one match), and displaying the sub-profile to searching user.

In some embodiments according to this aspect, visibility categories may be set differently for connections and non-connections, and users may be able to designate priority for each sub-profile, so that the highest-priority one is displayed. Users may be provided with the option to define sub-profile visibility based on endorsement path distance; the plurality of networking actions involving target member may be analyzed to identify endorsement paths, wherein each endorsement path includes a unique set of users who have sent and received endorsements of the target member to one another sequentially, wherein each endorsement path begins with a first-degree connection or endorsement of the target user and ends with a user who has received an endorsement of the target member but not sent an endorsement of the target user; and a determination may be made as to whether a searching user matches any endorsement path category for any of target user's sub-profiles based on the number and length of endorsement paths of target user that include the searching user. A searching user may view additional profile information beyond what is displayed on the card, wherein additional information may be displayed by expanding elements within the card or by linking to a profile page, wherein the profile page may display a sub-profile that includes elements not on the card.

In some embodiments according to this aspect, a plurality of networking actions may be stored, wherein networking actions may include endorsements made by members that are made visible to non-members, wherein non-member information is stored as receiving non-member information for each such endorsement; a plurality of social network profiles may be stored associated with users, each with associated visibility settings, wherein visibility settings include defining access levels for categories of non-members; a request may be received by a searching user to access a target user's social network profile, wherein the searching user is not a member of the social network; social networking actions may be analyzed to determine if searching non-member matches any receiving non-member information for endorsements in the database; and a determination may be made as to whether a searching non-member matches any endorsement path category for any of target user's sub-profiles based on the number and length of endorsement paths of target user that include the searching user, wherein each endorsement path includes a set of users who have sent and received endorsements of the target member to one another.

In some embodiments according to this aspect, an interface may be provided for social network members to share sub-profiles with non-members, wherein a unique web address is generated for each share and the sub-profiles are hosted at the unique web address; a request may be received from a searching user to access a target user's social network profile using a unique web address link, wherein the searching user is not a member of the social network; a web address link may be analyzed to determine searching user's place in endorsement paths, wherein each endorsement path includes a set of users who have sent and received endorsements of the target member to one another; and a determination may be made as to whether the searching non-member matches the visibility settings for any sub-profiles of target user.

In a further aspect, there is disclosed creation of virtual representations of offline networking, more specifically, scanning of physical business card to automatically create a virtual representation of the offline networking that the business card exchange involves.

According to this aspect, virtual representations of offline networking are generated, by providing an interface for a scanning user to scan physical business card, the interface cooperating with local hardware on the scanning user's computer or device to capture image of said business card; extracting text strings from physical business card image using an image processing algorithm; identifying contact information from text strings using a text recognition algorithm, wherein contact information includes at least one of: name, email address, or employer; and searching online networking environment to identify user accounts that match contact information.

In some embodiments according to this aspect, if no matches are found, a user interface may be provided that displays closest matching potential accounts and prompting user to select which, if any, is the correct account; whereas if multiple potential matches are found, a user interface may be provided that displays potential matches and prompting user to select which, if any, is the correct account. A user account may be created automatically if a matching user account is not found, wherein new user account is populated automatically using extracted information. An aesthetic profile may be extracted from physical business card image using image processing algorithm, wherein aesthetic profile includes generating color profile and style profile for card; and the style of user account automatically created based on the extracted aesthetic profile may be adjusted, wherein the style adjustments include at least matching color of certain profile elements to the business card.

In some embodiments according to this aspect, a user interface may be provided for the scanning user to indicate sending user from whom the business card was obtained, with the sending user information being stored along with transaction data; and an online networking environment may be searched to identify user accounts that match sending user information. A user interface may be provided for the scanning user to indicate if scanned card was received bilaterally or received unilaterally, and a virtual connection or endorsement may be established based on user input. A placeholder account may be established based on contact information if matching user account is not found; and an interface may be provided for scanning user to endorse placeholder account to other people. A virtual trading card may be created automatically for the placeholder account and the virtual trading card may be sent to other users as a form of endorsement. Ownership of a matching placeholder account may be transferred to a new user if matching placeholder account is found, and/or an interface may be provided for a new user to approve or deny retroactive transactions associated with matching placeholder account. For example, a new user may be verified as owner of a placeholder account, wherein verification code is send to email address or phone number of matching placeholder account, and the new user may be prompted to enter verification code as a prerequisite to taking control of the placeholder account.

In a further aspect, there is disclosed measurement of off-network networking actions, more particularly, measurement of virtual networking that takes place off-network, and accounting for this within the network.

According to this aspect, a social network representation is generated of off-network networking, by providing interface for a user to select a plurality of communication channels to be monitored; providing interface for a user to enter authorization credentials for communication channels; storing authorization credentials; constantly monitoring communication channels for new contacts; extracting contact information from communication channels for new contacts; searching online networking environment to identify user accounts that match contact information; and if matching account is found, prompting a user to make connection.

In some embodiments according to this aspect, connection may be made automatically, communication channels may include one of: email, text messaging, or third-party social networks, and there may be coordination with a user's local device or computer to monitor inbound and outbound text, phone, and email communication.

In a further aspect, there is disclosed creation of a website automatically to share social network profile out of network, more particularly, automatic generation of a website that displays a social network profile in order to share the social network profile with a non-member. As opposed to the simple expedient of allowing non-members to simply see a limited profile page, this aspect involves generation of a unique sub-profile display each time, which gives sharing members control over the content and visibility settings each time he or she shares the profile.

According to this aspect, a website is created to display social network profile information, by providing a sharing interface for social network users to share profile information with non-members, providing in the sharing interface a profile element library containing n profile elements, wherein profile elements may display data or provide interactive functionality, displaying automatically a visual layout of a draft sub-profile, the draft sub-profile containing k profile elements within an editable display area of the draft sub-profile, providing in the sharing interface the ability for sharing user to edit draft profile by adding and removing profile elements and by rearranging profile elements within the editable display area of the draft sub-profile, and creating a website from the draft sub-profile, the website being programmed to cooperate with computer hardware to display the draft profile, wherein each of the social network elements is constantly updated in response to changes in the underlying social network profile.

In some embodiments according to this aspect, for the automatic display of a visual layout of a draft sub-profile, a sharing user profile and/or existing profiles may be analyzed, wherein the automatic display is based on the analysis of a sharing user profile and/or on the analysis of existing profiles.

In some embodiments according to this aspect, as part of the sharing interface, there may be provided the ability for sharing user to create a second display area, also containing a maximum of k profile elements, wherein the second display area is accessible via a toggle switch displayed on the website. A unique web address may be generated each time a social network member shares a card with a given user, with tracking of website visits using unique web address to log each time a recipient views the card. As part of the generated website, there may be provided an interface for a receiving non-member to pass along the card again to a secondary receiving non-member, wherein the card may be passed using SMS or email or other social networks, wherein the receiving non-member has the option to input the name of the secondary receiving non-member. A unique web address may be generated each time a receiving non-member shares a card with a given secondary receiving non-member, with tracking of website visits using unique web address to log each time a secondary receiving non-member views the card.

In a further aspect, there is disclosed an electronic business card outfitted with an embedded window, more particularly, embedding interactive control elements into an electronic business card, wherein the control elements allow more robust interaction with a user.

According to this aspect, rich functionality is added to an electronic business card, by hosting a plurality of electronic business cards at a centralized server; providing interface for users to create an electronic business card or cards, wherein each electronic business card has an embedded window or windows, the window(s) displaying data served via the internet, wherein the information may be served from the centralized server or from third-party servers; providing user interface within an embedded window, wherein user interface displays data and allows user to interact with embedded window; receiving request from owner of card to change information that is displayed within a given window for a given business card; and updating said window automatically across all instances of card.

In some embodiments according to this aspect, the user interaction may include one of: liking, commenting, sharing, uploading, or editing data, and access credentials may be stored for third-party servers so that connections can be established automatically. Social network profile information may be displayed in an embedded window, wherein the embedded window is updated automatically when card owner changes underlying social network profile information. Information may be displayed within embedded windows in the form of apps, wherein an app-management interface may be provided to add apps and set up proper first and third-party connections to serve apps. App information may be displayed in a summary indicator format on the card, wherein the summary indicator updates automatically and displays information based on the underlying first or third-party connection.

In a further aspect, there is disclosed display of application summary information within an electronic business card, more particularly, generation of summary elements on an electronic business card, wherein summary elements display a limited set of data and allow interaction with underlying applications, including both first- and third-party applications.

According to this aspect, an application summary interface is displayed on an electronic business card, by displaying summary control elements within an electronic business card, wherein summary control elements display a limited list of data offered within one or more applications and a limited set of features that allow users to interact with one or more applications.

In some embodiments according to this aspect, underlying applications may be analyzed to determine what data to display and to derive a visual profile, with a visual profile being matched with the summary control element so that style of underlying application is preserved. The underlying applications may be social networking accounts, they may be derived from a first-party social networking system, and/or they may be derived from a third-party social networking system or other third-party software.

In a further aspect, there is disclosed a check of authenticity of endorsement based on network significance analysis, such as to determine if an endorsement is valid.

According to this aspect, an authenticity score is generated for a social network endorsement, by receiving a request from a sending user to endorse a subject user, wherein the endorsement is to be made visible to one or more receiving users; identifying all parties involved in endorsement, wherein parties include sending, subject, and receiving users; determining reputation of all parties involved in endorsement, including at least sending and receiving user; calculating reputation differential between sending and receiving user, wherein reputation differential is the difference in reputation between users; retrieving sample of X users who are similar to target user, wherein similarity may be determined by reputation; computing average reputation differential score profiles for X users who are similar to target user, wherein reputation differential score profiles include average reputation differential score ranges for endorsements of users; computing authenticity probability score, wherein the score in part is based on analyzing reputation differential scores of endorsements of target user, wherein analysis includes comparing reputation differential scores for endorsement of target user to average reputation differential profiles of users who are similar to target; and storing authenticity probability score along with networking data.

In some embodiments according to this aspect, a threshold may be set for an authenticity score below which networking requests are rejected.

In a further aspect, there is disclosed searching within a social network using endorsement paths and endorsement distance, for example, for optimization of search results based on a measurement of an endorsement path.

According to this aspect, a social network is searched using endorsement path distance, by storing a plurality of social networking relationships, wherein the relationships include connections and endorsements, wherein endorsement have sending members, subject members, and receiving members, wherein receiving members are those to whom endorsements are made visible; receiving a search request, the search request initiated on behalf of a searching member; processing the search request to return a plurality of results, including a plurality of target members; generating endorsement paths for at least one of a target member or the searching member; calculating endorsement distance scores between searching member and each target member; and determining a search score for each target member based on both how closely the user matches the search criteria and the endorsement distance score between target user and searching user.

In some embodiments according to this aspect, a display profile may be generated for each target member, wherein the display profile includes a numeric and/or visual indicator of target member's endorsement paths as well the endorsement distance score and the search score for each target member.

This summary has been provided so that the nature of this disclosure may be understood more quickly. A more complete understanding can be obtained by reference to the following detailed description and to the attached drawings.

BRIEF DESCRIPTION OF THE DRAWINGS

The present disclosure is illustrated by way of example, not by way of limitation.

DETAILED DESCRIPTION

The systems and methods of the present disclosure can be implemented in a number of ways, including as a processor, such as a processor designed to follow instructions coupled to a memory, a computer program product on a computer readable storage medium, a system, an apparatus, and a process. In this specification, any implementation or form the disclosure may take is referred to as a technique. The term "processor" as used herein refers to one or more devices, circuits, and/or processing cores configured to process data, such as by computer program instructions. It is understood that the techniques described in this specification can be modified and altered in various manners, as well as be implemented as both hardware and software. The systems and methods described can be implemented in a variety of electronic environments, partial computing environments, and real-world environments. In some embodiments, the techniques are implemented in programmable computer environments that include a computer network, a processor, servers, and a storage medium readable by the processor (which includes both volatile and non-volatile memory).

The present disclosure includes improved systems and methods for measuring network significance and reputation in a social networking environment, as well as improved systems and methods for measuring the paths of endorsements and trading cards in a social networking environment, and for generating virtual representations of offline networking. Taken together, the systems and methods laid out in this specification describe an integrated social networking platform and reputation system. In some exemplary embodiments, the disclosure is implemented as a business social network based on electronic trading cards that provides improved systems and methods for evaluating employee performance and network significance. The unique trading card format results in a system that encourages networking and making introductions, which helps build culture within firms and helps build relationships across firms. In some embodiments, the disclosure comprises a social network, which is referred to as a first-party social network, and in some embodiments the disclosure includes aggregating information from multiple third-party social networks.

The exchange of electronic trading cards is an enhanced form of endorsement, which means it acts as an endorsement but has more robust features than a typical endorsement, such as that it may share non-public profile information with the recipient. It will be appreciated that this is a non-limiting example, and that as used herein, the term "endorsement" is used to describe any endorsement within a social networking environment. In some preferred but non-limiting embodiments, passing along the electronic trading card of a person or product is a recommendation, which as used in this specification is a form of endorsement that is made visible to only one person at a time.

Figure 1:
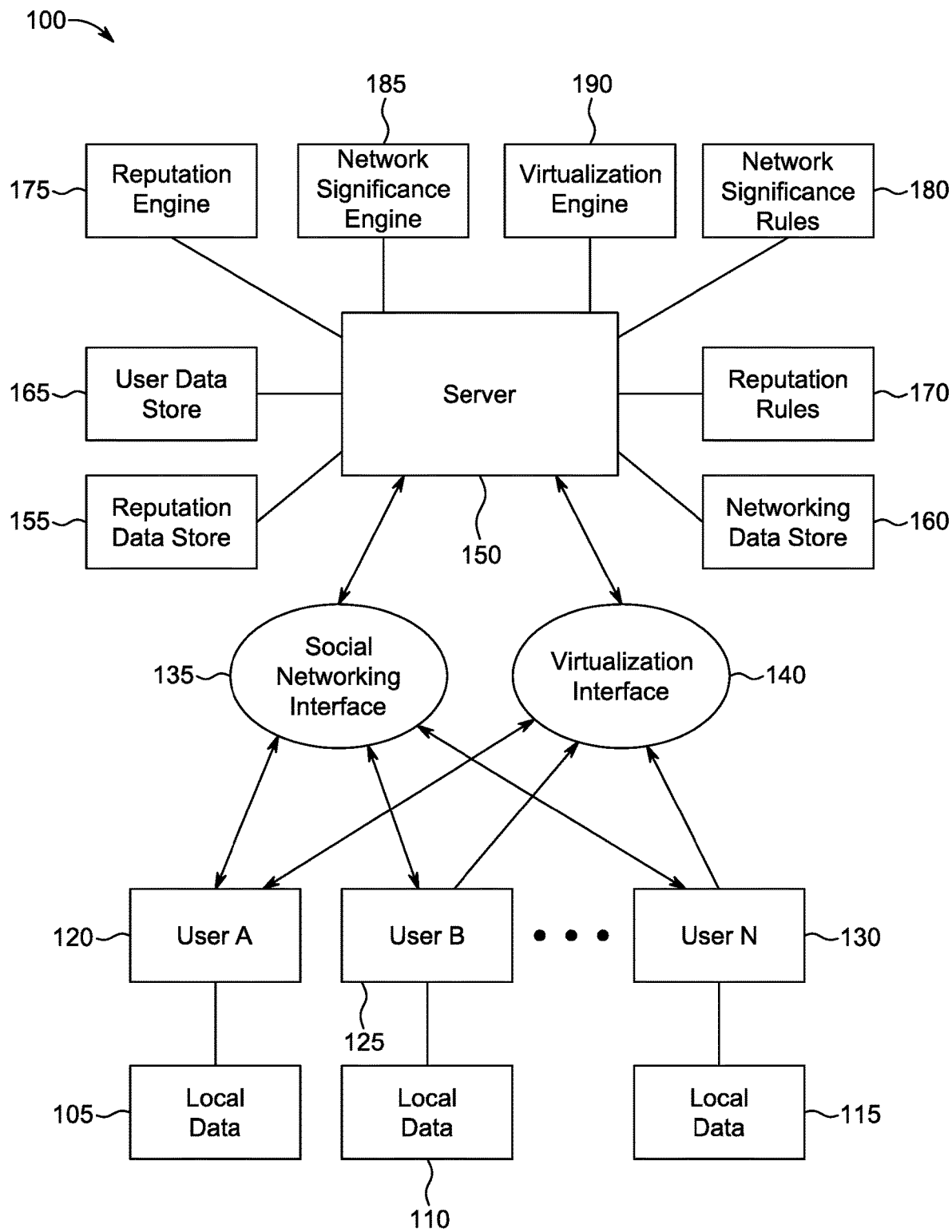
FIG. 1 shows an exemplary social networking and reputation platform.

An illustrative implementation of system and methods described herein in accordance with some embodiments is shown in FIG. 1. In particular, FIG. 1 shows an illustrative implementation of exemplary social networking and reputation platform 100 in accordance with some embodiments. As shows in FIG. 1, exemplary social networking and reputation platform 100 includes user computing environment 120, user computing environment 125, up to and including user computing environment 130, social networking interface 135, virtualization interface 140, server computing environment 150, reputation data store 155, networking data store 160, user data store 165, reputation rules 170, reputation engine 175, network significance rules 180, network significance engine 185, and virtualization engine 190. In some embodiments, user computing environments 120, 125, and 130 can communicate with server 150 via social networking interface 135 to both send and receive data. FIG. 1 also shows local data stores 105, 110, and 115 which contain a plurality of data that can be generated by user computing environments 120, 125, and 130 or received from server 150. Local data stores 105, 110, and 115 allow data to be stored, viewed, displayed, transmitted, navigated, and printed from the user computing environments. In one illustrative embodiment, users may request and receive reputation data that is stored in local data stores 105, 110, and 115. In the exemplary implementation shown in FIG. 1, reputation engine 175 cooperates with network significance engine 185 and requests and receives data from networking data store 160 and user data store 165 within server environment 150 to process requests for reputation data from user computing environments 120, 125, and 130 and to send reputation data to the requesting user computing environment, which is capable of processing and storing data in the local data store. It should be understood that local data store 105, 110, and 115 can include permanent and temporary storage. In another example, user computing environments 120, 125, and 130 can send networking data to the server through the social networking interface 135. FIG. 1 also shows that user computer environments 120, 125, and 130 can send data to the server using virtualization interface 140. Virtualization interface 140 allows users to input artifacts of offline networking and is capable of processing the artifacts to extract networking data which is stored in networking data store 160. In some embodiments, server 150 is electronically connected to user computing environments 120, 125, and 130 via social networking interface 135 and virtualization interface 140. In some embodiments, social networking interface 135 and virtualization interface 140 are communications networks that include fixed-wire and/or wireless intranets, extranets, and/or the internet.

Social Network Operation

Users of the social networking system sign up by completing a registration page and providing a valid email address and password. Users then create a profile that includes a personal trading card element, which is an improvement on a traditional electronic business card. In some embodiments, user profile information is stored in user database 165, as shown in FIG. 1. Users may provide a range of additional profile information related to experience, skills, goals, projects, and other background information. In one embodiment, personal trading cards resemble sports trading cards. In this specification, the term "personal trading card" is used to denote the unique type of electronic trading cards that take advantage of at least one aspect of the disclosure.

Figure 2:
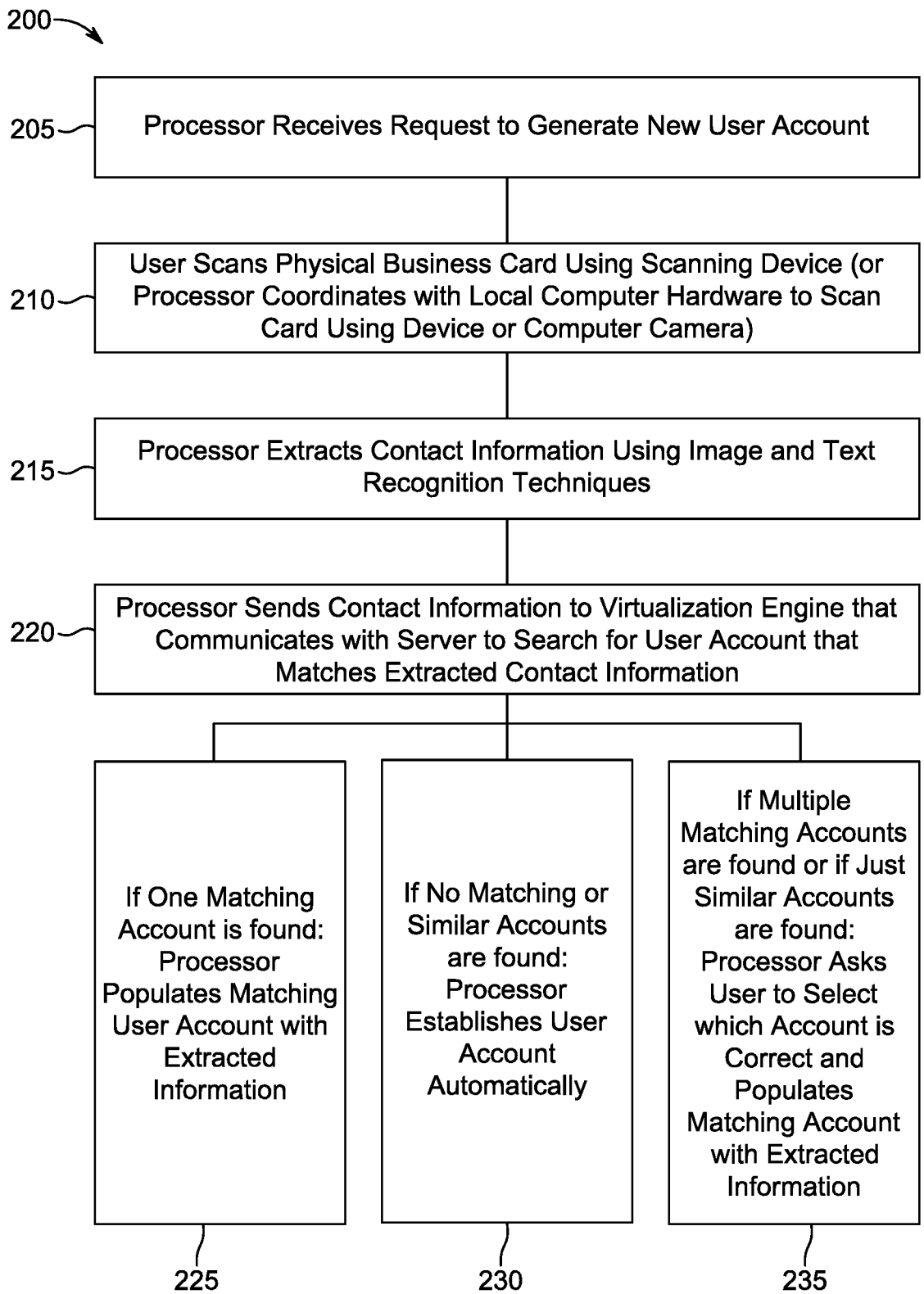
FIG. 2 shows an exemplary method for creating a social network account by scanning a physical business card.

In some embodiments, new users have the ability to scan their personal physical business card to automatically create a social network account. FIG. 2 shows an illustrative representation of an exemplary account creation method. In particular, FIG. 2 shows a detailed illustrative implementation of exemplary account creation method 200 in accordance with some embodiments. As shown in FIG. 2, a processor receives a request to generate new user account 205, a user is prompted to scan a physical business card using personal device 210 wherein the system cooperates with user's local computing hardware, a processor extracts contact information using image and text recognition techniques 215, a processor sends extracted information to virtualization engine to search for matching user accounts 220. If one matching account is found, processor populates matching user account with extracted information 225, thus updating user account, if no matching account and no similar accounts are found then processor generates a new user account automatically 230, and if multiple matching accounts are found or if a similar account or set of accounts are found then processor displays a list of potential matching accounts and asks user to select appropriate account 235. In some embodiments, a verification message is automatically sent to the email address or phone number extracted from the physical business card, the verification being required before the account is created. In some embodiments, extracted information may include name, email address, phone number, employer, and job title. In some embodiments, an aesthetic profile is generated that includes defining a plurality of visually perceptible elements that correspond to the scanned business card, which may include employer logo, color scheme, and fonts. This aesthetic profile may be used to automatically match the user account to the card that was used to generate it, which may include selecting matching colors and fonts and using the logo within the user account.

Users are able to design personal trading cards within the system interface. The present disclosure includes systems and methods for improved electronic business cards. In some embodiments, personal trading card are designed to resemble sports trading cards in aspect ratio and format of information. Preferably, the visual aspect ratio of the personal trading card is similar to the aspect ratio of traditional sports trading cards, such as 2.5-to-3.5. In some embodiments, users create a sub-profile that includes a subset of profile information to be displayed on the personal trading card. In some embodiments, personal trading cards display an embedded window or windows that display data served via the internet. The embedded window offers richer features and functionality than the information displayed on traditional electronic business cards.

Figure 3:
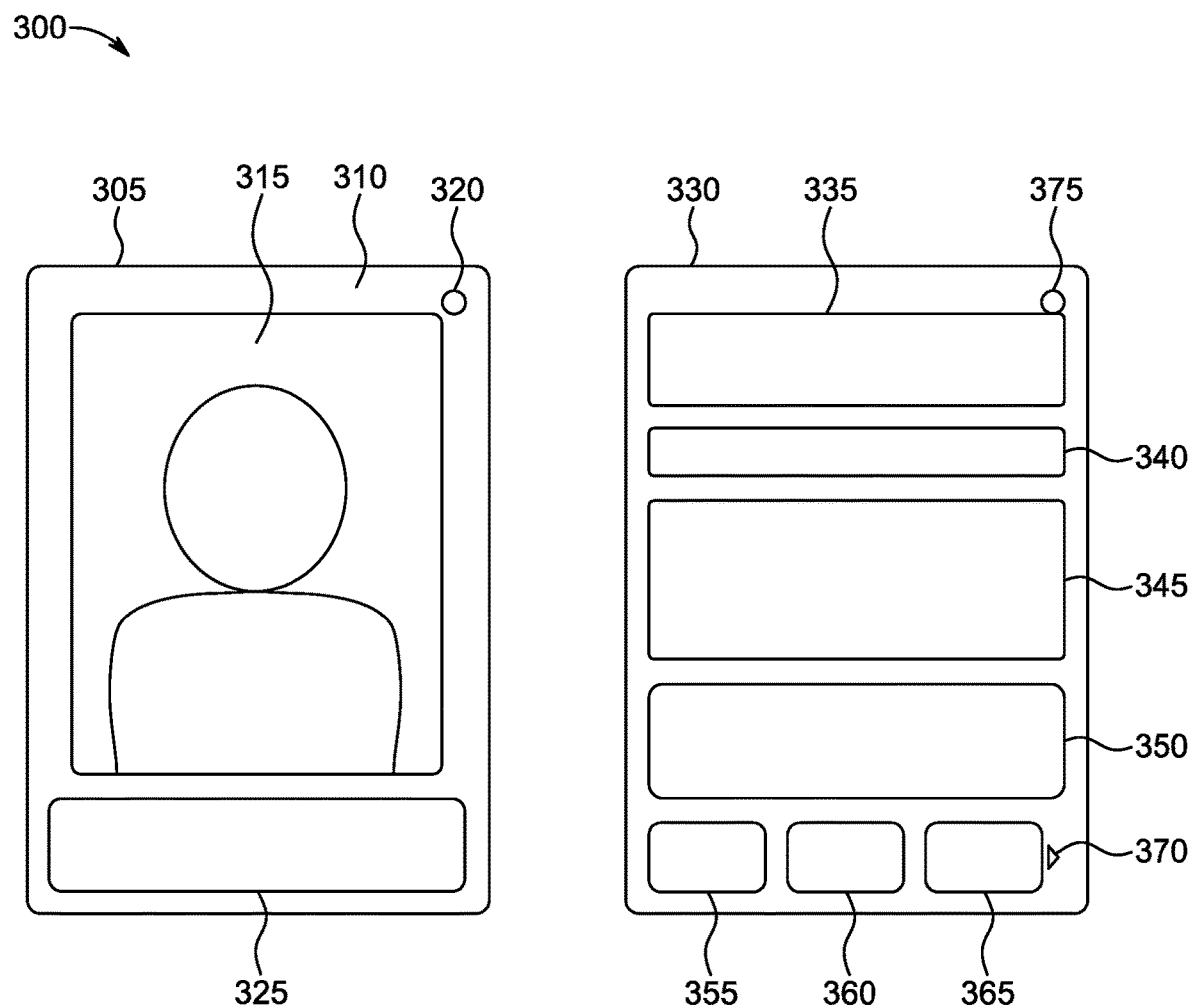
FIG. 3 shows an exemplary personal trading card layout.

FIG. 3 shows an illustrative representation of an exemplary personal trading card according to some embodiments. In particular, FIG. 3 shows exemplary personal trading card 300 in accordance with some embodiments. As shows in FIG. 3, exemplary personal trading card 300 includes personal trading card front 305, which includes a background color or image 310, user profile image 315, front/back toggle button 320, and data display profile element 325; and personal trading card back 330, which includes data display elements 335 and 340, interactive control elements 345 and 350, buttons 355, 360, and 365, scroll indicator 370, and front/back toggle button 375. Data display profile elements (such as profile elements 325, 335, and 340) display text, image, audio, and video data. Interactive control elements (such as profile elements 345 and 350) may display data but are distinguished by the ability for the user to interact beyond just pressing a button, for example by liking and commenting on a social feed, or sending a message, or uploading a document. In some embodiments, data display element 325 on the front displays user's name, job title, and employer logo. In some embodiments, the back side includes a more detailed display of resume information, similar to the career summary information that may be found on a sports trading card. In some embodiments, data display elements include a highlight reel of a user's professional highlights and contact information. In some embodiments, interactive display elements include a social networking feed, and in some embodiments an aggregate of multiple social networking feeds. In some embodiments, buttons and interactive control elements coordinate with user's local computer or device to make use of local functions (for example, launching the messaging function of a phone or uploading an image from a user's local photo library). In some embodiments, personal trading cards have a front and back side, which can be toggled via a toggle indicator on the card. In some embodiments, personal trading card profile elements display information from websites, applications, and cloud services. This information is updated dynamically. In some embodiments, the personal trading card elements display information from a social networking system. The information displayed on a personal trading card goes beyond the contact information typical of electronic business cards and includes more detailed resume and social networking information. In some embodiments, data may be served from a centralized server, such as a social network, or from third-party servers, such as an enterprise software product.

Figure 4:
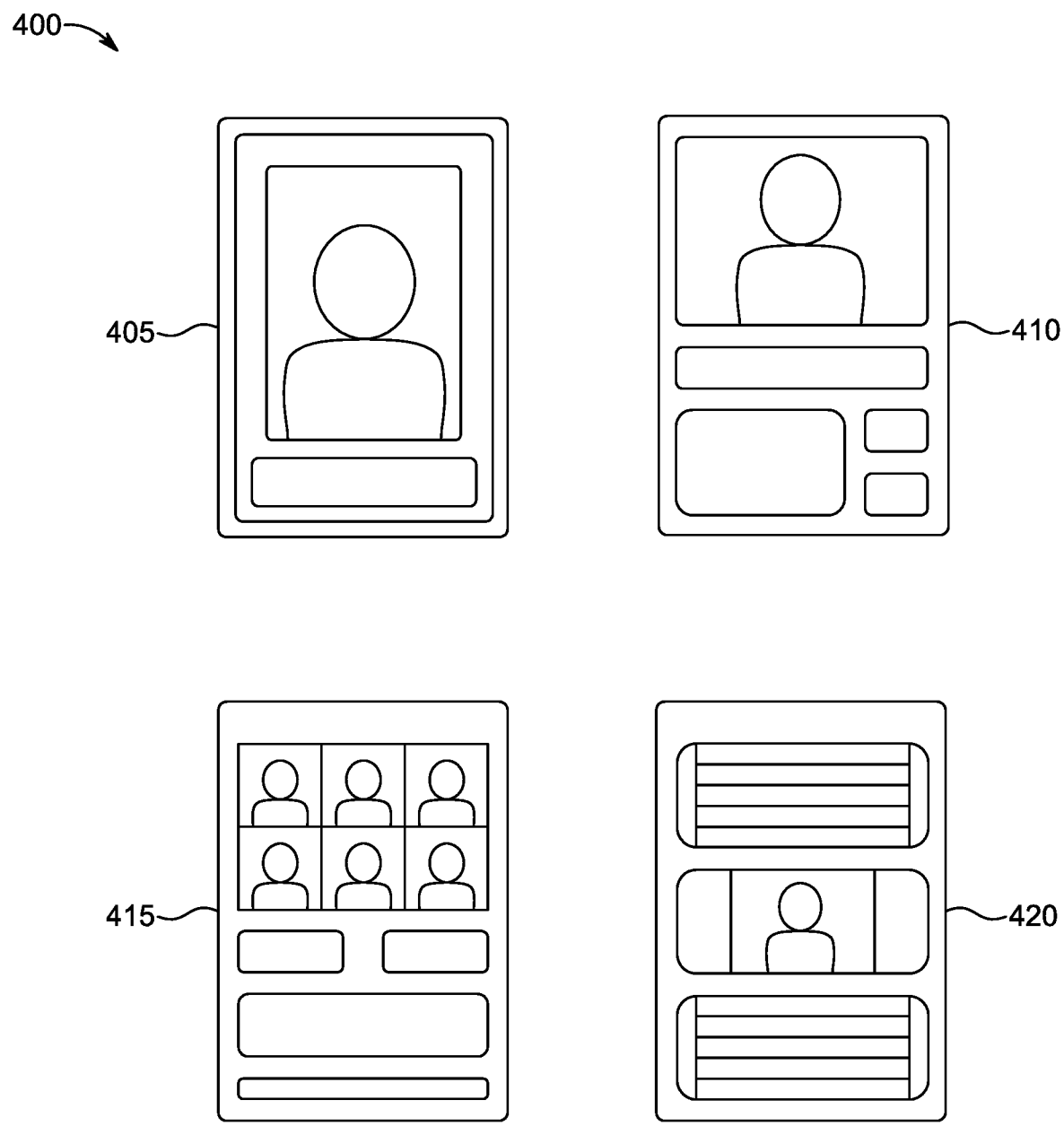
FIG. 4 shows exemplary personal trading card templates.

It is understood that the exemplary personal trading card shown in FIG. 3 is a non-limiting example, and that the arrangement, number, and type of profile elements on both the front and back side are flexible. In some embodiments, personal trading card layouts are adaptive to the device, screen, and window size on which they are being viewed. In some embodiments, templates are provided for users to choose from. FIG. 4 shows some additional exemplary template layouts. As shown in FIG. 4, exemplary personal trading card front template layout 405 depicts a personal trading card front with a border, exemplary personal trading card front template layout 410 depicts a personal trading card front with a smaller user image and a greater number of data and interactive control elements, exemplary personal trading card back template layout 415 depicts a personal trading card layout with multiple images that users may scroll through, and exemplary personal trading card back template layout 420 depicts a personal trading card layout with three different social networking feeds displayed from three third-party social networks. In some embodiments, the profile elements are scrollable and in some embodiments they are expandable. In some embodiments, the entire display area of both the front and back may be scrollable or expandable, so that more elements can be included than fit within the bounds of the display.

In some embodiments, in addition to being represented as objects within a social networking system, personal trading cards may be represented in a unique cross-platform and cross-device format that is richer than existing electronic business card formats because it includes interactive web-based or cloud-based control elements. In some embodiments, personal trading cards are hosted as responsive websites.

The disclosure includes displaying summary data and providing summary functionality on the personal trading card, wherein summary data is a limited set of data that is drawn from the first or third-party servers. Summary functionality is a set of actions that a user can take to interact with a given window, wherein the actions include coordinating with the social network or third-party servers. Summary data and summary functionality can be non-public, which means that the card conveys implicit permission to view certain information. In some embodiments, summary data includes non-public information drawn from the profiles of the centralized social network or third party software or networks. Summarizing information according to this specification is beneficial because it allows users to share more robust information on an electronic business card without requiring giving people full access to the underlying profiles. The user can designate specific summary metrics that are updated constantly. In some embodiments, summary data is drawn from third-party enterprise software. For example, summary data for a user review application may include the average reviews that the card owner has received.

The present disclosure includes systems and methods for generating a static summary card for display in email or for printing. In some embodiments, users are provided an interface for editing and generating summary cards. In some embodiments, the system automatically populates a draft that displays a subset of profile elements by analyzing a user's social network profile, and allows the user to edit the draft and then create a summary display profile. The summary display profile may include multiple windows, each of which is associated with one profile or network element and provides summary data or summary functionality. The present disclosure includes a device for printing cards on sports trading card-sized cards, wherein the printer is served reputation information and the proper draft profile.

Personal trading cards have a number of specific advantages over traditional electronic business cards. Personal trading cards include embedded windows that provide information and functionality that is richer than the contact information displayed on traditional electronic business cards. In some embodiments, personal trading cards include a social networking feed. This is a feed of the card owner's updates and professional highlights that is embedded directly into the electronic business card. Providing social networking functionality, such as the feed and messaging, directly within the electronic business card is a unique component of the present system. The feed may display a limited indicator of the activity each post represents, and each post may be hyperlinked to another webpage or interface that displays the feed in full. The social networking feed may comprise information from within the system or display third-party social network information, for example via application program interfaces (APIs).

In some embodiments, personal trading cards use embedded apps to display various information and to provide various features. Apps display control elements and are interactive. Apps may display social networking information, such as updates about other users, as well as include social networking features, such as the ability to communicate and share files. One example app is an indicator of how many cards the user has collected, which may be a count of the collected cards or a graph. Apps may include skills, highlight reels, and position-specific apps, such as for a sales team. Apps may have indicators that are displayed on the card, which display summary information about the app and are hyperlinked to more detailed app pages with additional information and features. In some embodiments, such an app page is displayed as a pop-up window. Apps may be native to the social network or provide connections to third-party software using APIs. In some embodiments, users or certain users may create apps and may be provided an interface for doing so. In some embodiments, personal trading cards display a subset of social network profile information. In some embodiments, receiving a card gives one access to information that is on the card but also provides access to additional, non-public profile information. Non-public information is any information that requires permission to view. This means that receiving a user's card actually changes the permissions with respect to said user's profile information. This additional information can be presented within an embedded window, a pop-up window, or via a hyperlink to a more robust profile page. Providing this additional non-public social networking information allows the exchange of personal trading cards to facilitate richer interaction between users. In one illustrative embodiment, passing along a card within a company provides complete access to a user's profile.

Figure 5:
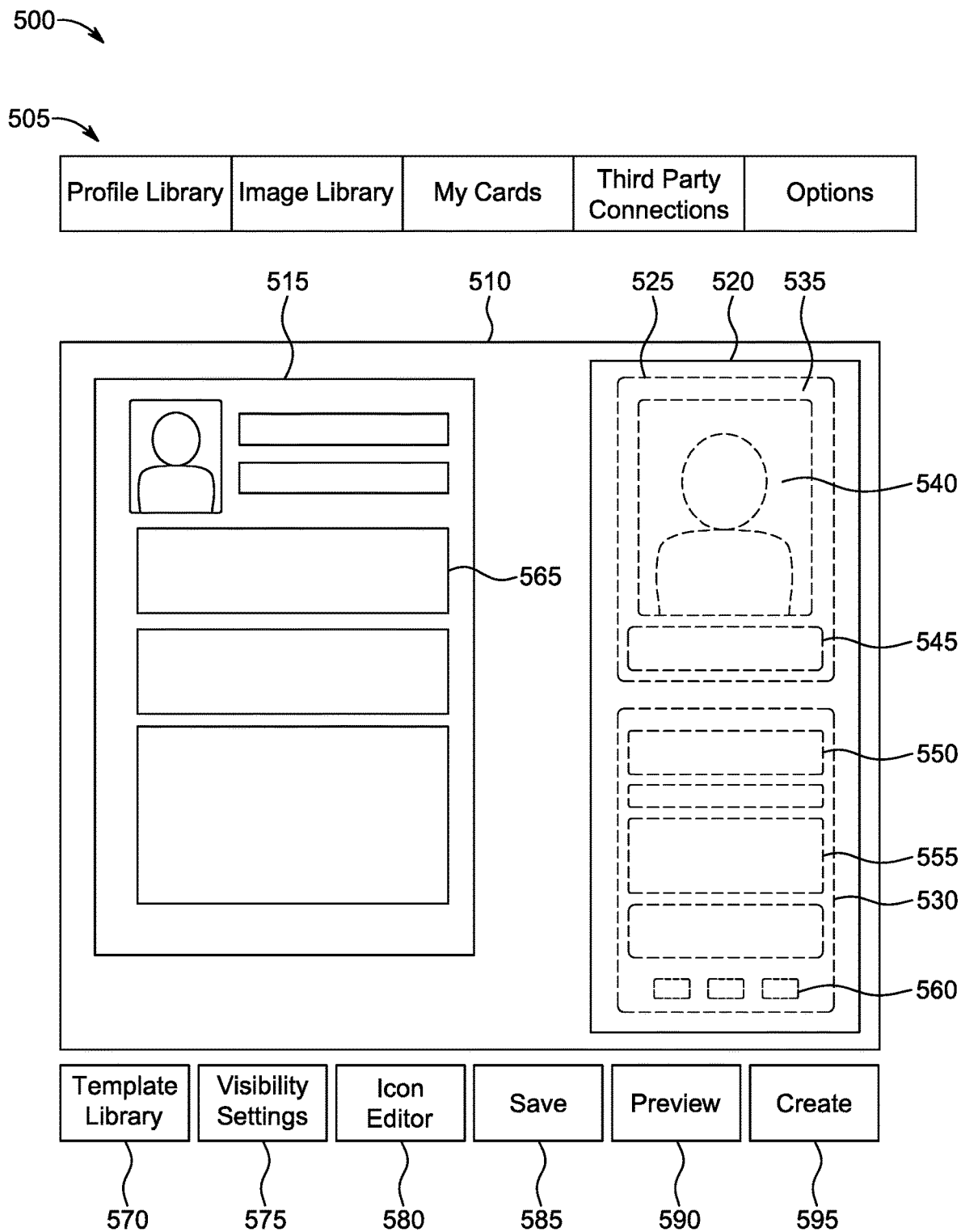
FIG. 5 shows an exemplary automatic card creation interface.

In some embodiments, a user's social network profile is analyzed and a draft personal trading card is automatically created for the user, the draft personal trading card including a number of profile elements. FIG. 5 shows an illustrative representation of an exemplary personal trading card creation interface. In particular, FIG. 5 shows a detailed illustrative implementation of exemplary card creation interface 500 in accordance with some embodiments. Exemplary card creation interface 500 may be a webpage or series of webpages that allow users to view and edit a draft personal trading card, wherein the draft personal trading card is generated automatically by the system and may include a front side 525 and back side 530. As shown in FIG. 5, users are shown an interface that includes a toolbar 505, a card editing window 510, and a series of action buttons 570, 575, 580, 585, 590 and 595. In some embodiments, card editing window 510 includes personal trading card editor 520 and visual profile element display 515. In some embodiments, personal trading card editor 520 is a drag-and-drop interface that allows users to visually design the personal trading card. In some embodiments, visual profile element library 515 displays all active profile elements within the user's social network profile whereas the complete set of profile elements (active and inactive) can be accessed using the profile library button in toolbar 505. Within card editor 520 users are shown draft card front side 525 and draft card back side 530. In preferred but non-limiting embodiments, the draft card front side 525 and back side 530 are pre-populated based on an analysis of the user's social network profile 515. In some embodiments, draft card front includes background art 535, photo field 540, and one or more data display (text or graphic) fields 545. In some embodiments, draft card back includes data display field 550, interactive control element display field 555, and button 560. In some embodiments, interactive control elements display data and allow users to interact, such as by inputting information and performing actions. In some embodiments, interactive control elements may send and receive data to and from third-party websites, applications, and programs. In some embodiments, users may drag profile elements such as 565 from visual profile element library 515 and into personal trading card editor 520 in order to add a new element, and vice versa. Users can resize and relocate profile elements through a drag-and-drop interface as well. In some elements, users are provided a trash icon (not shown) into which unwanted elements can be dragged from the personal trading card editor to be removed. In some embodiments, profile elements include scrolling functionality that allows more information to be included than fits in the display. In some embodiments, interactive control elements have an option to load or display more data. In some embodiments, the front side 525 and back side 530 of cards occupy a fixed ratio but the display area on each side is scrollable so that more elements can be included than fit in the visual display. In some embodiments, the generated card is responsive, meaning it adjusts the display according to the size of the device or display area on which it is located.

FIG. 4 also illustrates a plurality of exemplary buttons within toolbar 505. In some embodiments, toolbar 505 includes buttons to select an image library, a library of user's previously designed cards, a third-party connection manager, and account options. In some embodiments, selecting a toolbar button loads an interactive pop-up window. FIG. 4 shows a number of additional buttons presented to the user outside of the toolbar, including template library button 570 (which allows users to select from a list of preset element layouts), card visibility settings button 575 (which allows users to select card visibility settings), icon editor button 580 (which allows user to edit and create static icons that represent the card for display environments where the full card is too large, such as for attachment in an email), save button 585 (which saves the draft card for later review), preview button 590 (which generates a live preview of the card), and create card button 595 (which generates the card and adds it to user's library of personal trading cards). It should be appreciated that the disclosure is not limited to any particular arrangement of the elements described in card creation interface 500, including which buttons are located within toolbar 505 and which are located below card editing window 510.

Users may design multiple trading cards, each with a distinct set of profile elements and visibility settings. Users may be directed in designing personal trading cards by system-provided prompts or tutorials. In one embodiment, the social networking system is designed for professionals, but it should be clear that this disclosure applies to other uses of exchangeable digital cards, such as those that represent an organization, product, service, or website. In some embodiments, a user may create different cards for public and internal company use, wherein the internal card is visible to users who are at the same firm as the card owner and the public card is visible to any user who has received the card.

The system provides an interface and storage for users to collect cards of other users in a digital wallet or other collective representation of cards. In some embodiments, this storage is provided in a user database. Users are able to exchange their own personal trading cards bilaterally, as a form of connection, and are also able to unilaterally pass along their own personal trading card and to pass along trading cards of others they have collected.

In some embodiments, a sending user is given the option to request a bilateral connection with a receiving user. In some embodiments, the receiving user is able to view the sending user's card before accepting or denying the bilateral connection. If the request for a bilateral exchange is accepted, the receiving user may share his or her card with the sending user. Two users who have exchanged cards bilaterally may be said to be first-degree connections. The people connected to one's first-degree connections are second-degree connections, and so on to N-degree connections. The disclosure makes a distinction between two users who have exchanged cards bilaterally and two users who have simply received each other's card from third parties.

In some embodiments, sharing a card allows the receiving user to view non-public profile information as displayed on the card, which may involve aggregating non-public information from multiple social networks. This is an improved method for creating a connection because it allows the recipient to view information about the sending user in order to become better informed before deciding whether or not to accept the request. This is better than allowing the recipient of a social network connection request to view the requesting user's entire profile on the social network for two reasons: first, it allows the user to curate the subset of information that is displayed and, second, it allows the user to securely share information from multiple social networks. In some embodiments, the degrees of endorsement between two users is displayed as well, which is an improved way to measure network relationship between unacquainted users, beyond just degrees of connection. Degrees of endorsement are described in greater detail below, in the section on "Endorsement Paths".

In some embodiments, users are also able to share their own card unilaterally with another user without requesting a bilateral exchange, as a form of self-introduction. In some embodiments, the self-introduction includes sharing certain non-public profile information in order to share more information about the person making the self-introduction. In some embodiments, the self-introduction is used to share a user's card with a person who is not a member of the network. In some embodiments, the self-introduction takes place in a recruitment context, wherein potential employees create a personal trading card to share with a recruiter and the card includes resume details.

Users may also unilaterally pass along the personal trading cards of others, as collected in the user's wallet, as a form of endorsement. In some preferred but non-limiting embodiments, sharing an electronic card unilaterally is a recommendation, which is a special form of endorsement that is made visible to a single user. A recommendation is stronger than a typical endorsement because it is intrinsically personalized. This is based on the premise that defining an audience for an endorsement discourages users from making inaccurate endorsements. For example, users are less likely to write a fabricated endorsement of a friend in order to artificially boost that friend's reputation if the endorser has to share that endorsement directly with a given user, or even a small set of users.

In some embodiments, a sending user shares a card or multiple cards from their wallet with a second user, who receives a copy of the electronic business card or cards. In some embodiments, users can set up trades where they offer to exchange a number of cards with another user. This may include asking for a specific card or introduction. In some embodiments, when multiple cards are passed on at a time, each is treated as a discrete recommendation, made visible to a single recipient, rather than traditional endorsements that are made visible to many people at a time. Each of the multiple recommendations may be given a unique identifier. In some embodiments, receiving a copy of a card involves receiving permission to view the card. Users may pass along cards that they have collected via bilateral exchanges as well as cards that have been passed along to them unilaterally. Forwarding a card unilaterally may or may not require permission from the card owner. The system keeps track of the people who receive cards and uses this information as a unique source of data for determining relationships between users and calculating reputation. Personal trading cards can be dynamically updated at any time, including after they are collected. In some embodiments, updating personal trading card contact information includes coordinating with the local device and/or computer of users who have collected the card in order to update local contact management systems.

The system incudes other types of cards besides electronic business cards that may be issued and exchanged on the platform. Cards can be generated by the system, by all users, or by designated users. It is understood that all card types are susceptible to the same methods and systems laid out in this specification, including those for virtualization of offline networking, generation of endorsement paths, and calculating reputation. Cards include: affiliation cards, which indicate membership in a given group; skill cards, which indicate skills possessed by the card owner; project cards, which are given out to members of a project; commemorative cards, which mark notable events or milestones; badge cards, which are used to reward behavior; and request cards, which allow users to ask for responses to various business inquiries. Cards may have a scarcity score and associated value, such as a reputation value. Additionally, user groups can be defined as the recipients of a given type of card, which allows card visibility to be set based on the exchange of these card types.

Project cards are unique because they can include embedded or hyperlinked project portals with advanced functionality, including: task management, goals, scheduling meetings, deadlines, budgets, and performance management. Project cards are tracked by a system that allows users to identify people who played a role in multiple projects and to define groups of users who participated in the same project or similar projects.

The present disclosure also includes improved systems and methods for encouraging use of the social networking platform. In some embodiments, the specific use that is encouraged is unilateral passing along of cards as a method of increasing the number of virtual connections that are made. In some embodiments, gamification techniques are implemented that encourage users to exchange cards and to pursue business goals. In one embodiment, this gamification system is based on the receipt of badge cards, which may have an associated card collection value. Badge cards may be tied to various network behavior, such as when a user's card has been passed along a number of times or when a user has made a certain number of bilateral exchanges. Badges can be represented as icons on personal trading cards in addition to being distinct cards that users can collect. Some badges are built into the system, others can be added. Badges can be specific to various profile apps on the electronic business cards. Examples of behaviors that are tied to badges: trade cards with X people internally, trade cards with X people from a specific subnetwork, collect X special cards, update profile X weeks in a row. Badges can include scores that are used in certain embodiments of reputation scoring. Badges can also have rewards, including: new card templates, new apps, and more access to reputation information. Admins of a company may create different cards tied to specific goals, assigning card collection points to each. In one embodiment, a card collection score is generated based on the cards that a user has collected.

Another method to encourage use of the platform involves creating artificial endorsement scarcity in a social networking environment. In some embodiments, this includes instating limits on the number of endorsements and bilateral exchanges in a given time period as well as limits on who may endorse who. For example, users may only be able to endorse people whose cards they have received. Limits can also be set based on how far removed by degree of endorsement a recipient is from a target user. Another aspect involves limiting the number of times that a recipient may pass along a card that she/he has received unilaterally. For example, a user might only be able to pass on a card X times before being required to complete a bilateral transaction. Limiting the number of actions that users can take encourages people to make better use of their decisions and also encourages regular use.

Virtual Representations of Offline Networking

The present disclosure includes improved systems and methods for establishing virtual representations of offline networking within a social networking environment, thus improving the operation of a social network by accounting for offline networking that would otherwise be missing from the virtual community.

Figure 6:
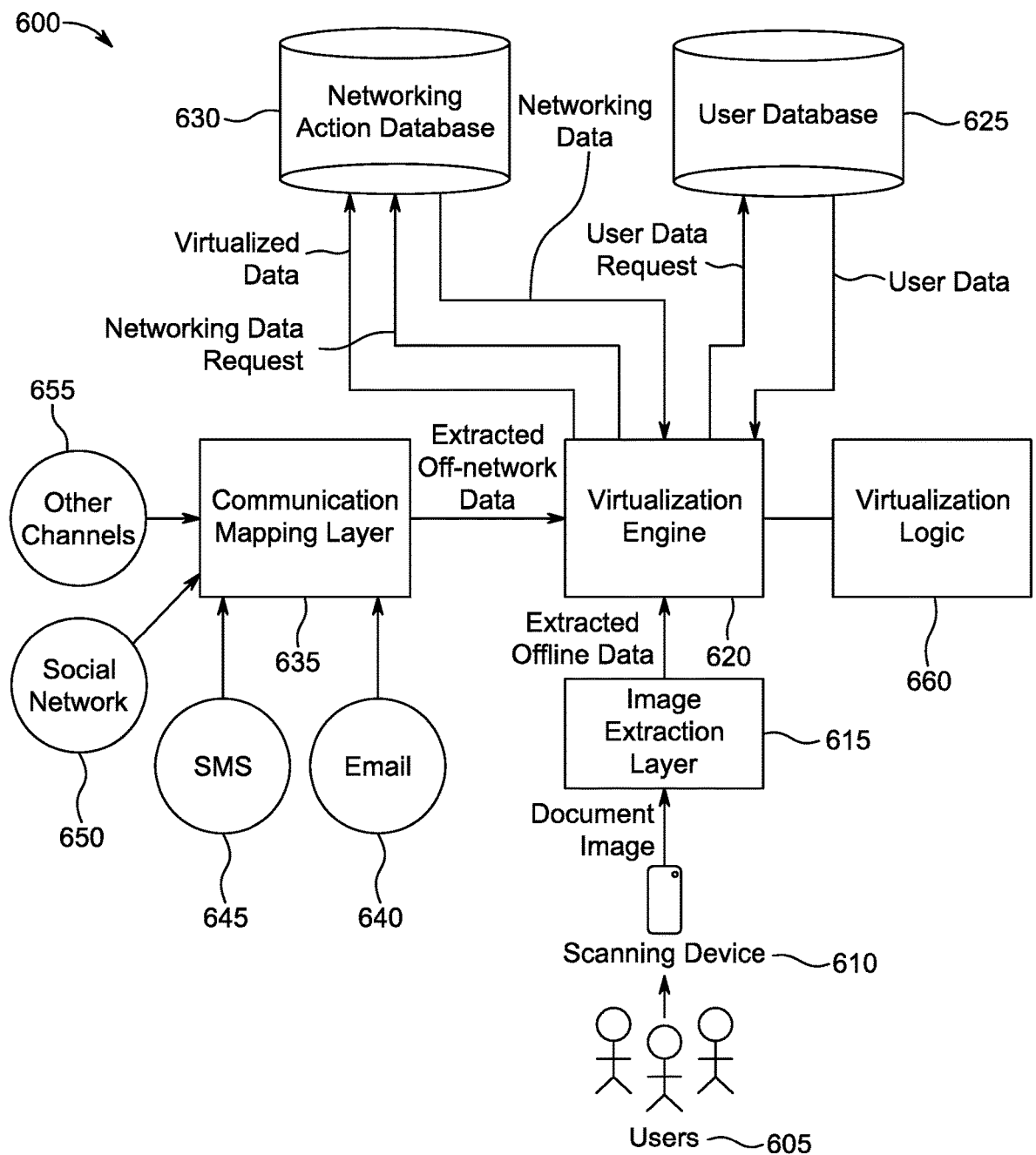
FIG. 6 shows an exemplary offline and off-network networking visualization system.

FIG. 6 shows an illustrative representation of an exemplary off-network and offline networking virtualization system. In particular, FIG. 6 shows a detailed illustrative implementation of exemplary offline networking virtualization system 600 in accordance with some embodiments. As shown in FIG. 6, the exemplary offline networking virtualization system includes users 605, scanning device environment 610, image extraction layer 615, virtualization engine 620, user database 625, networking action database 630, communication mapping layer 635, and off-network communication channels 640, 645, 650, and 655. In some embodiments, users 605 collect physical business cards and scan them into the system using distributed scanning devices in scanning device environment 610, which sends images to image extraction layer 615, which uses text and image recognition methods to extract user data and send it to virtualization engine 620. In some embodiments, virtualization engine 620 generates a user search request and sends it to user database 625, which returns potential matches. If one matching user is found, virtualization engine 620 sends virtualized data to networking action database 630. If multiple potential matches are found, virtualization engine 620 prompts user to select which is matching account. If no matching users are found, virtualization engine 620 generates a request to search networking action database 630 for extracted user information, and receives potential matches. A user may show up in the networking action database without being a user if they have been sent a card by a member who entered the recipient name. In some embodiments, if no matching user is found the scanned cards are simply stored in a user's wallet as images.

In some embodiments, scanning device environment 610 includes a virtualization interface (not shown) that provides a connection with a centralized server (not shown) containing the virtualization engine and relevant databases via the virtualization engine. In some embodiments, the virtualization interface allows users to scan or upload images of business cards collected during physical networking interactions using the user's local computer or device, wherein the system cooperates with the user's local computer or device hardware to utilize the computer or device camera to scan or upload images. In some embodiments, the scanned or uploaded image is transferred wirelessly to the processor and centralized server using the internet, and the processor then extracts information and searches for a matching user.

In some embodiments, communication mapping layer 635 monitors user's email 640, SMS messaging services 645, social networks 650, and other communication channels 655, and extracts off-network networking data which is sent to virtualization engine 620. In some embodiments, communication mapping layer 635 consists of first-party application program interfaces (APIs) that are configured to coordinate with third party APIs to constantly monitor user communication channels for potential new contacts, such as new people who have sent an email. In some embodiments, extracted off-network data is used to suggest connections rather than to automatically create connections.

In some embodiments, virtualization engine 620 includes virtualization logic layer 660 that analyzes search results from user database 625 and networking action database 630 to determine what type of connection to make and to identify the parties involved. In some embodiments, the virtualization engine 620 searches user database 625 to determine if the extracted user is a member of the network. If a match is found, the system includes searching to see if the matching user has scanned the scanning user's card and, if so, automatically transfers matching user's virtual electronic business card to the scanning user, thus establishing a bilateral connection. In this manner, two users who know they are both members can easily scan each other's cards to connect. In some embodiments, the system only establishes the bilateral connection if the matching user has scanned the searching user's card within a certain time window. In some embodiments, the matching user must approve the transaction before his or her virtual card is transferred to the scanning user. In some embodiments, the scanning user must approve or deny the transaction before receiving the matching user's virtual card. In some embodiments, a basic personal trading card that displays limited information is shared automatically, which is replaced with a full card once permission has been granted by card owner. In some embodiments, scanning user may indicate that they received a card unilaterally, in which case the matching user's virtual card may be transferred to scanning user automatically. In some embodiments, this requires permission from the matching user.

In some embodiments, virtualization engine 620 prompts scanning user to indicate from who he or she received the card, and the system searches to see if that user is part of the system and, if so, stores that user as a sending user, thus accounting for the case where a card has been passed on more than once from its original owner. In one embodiment, the system checks if both users are connected or part of same networking sub-environment, such as employees of the same firm, and provides different levels of access to matching user's account accordingly. In one embodiment, the scanning user is asked to select if a given card is a connection, the result of a bilateral exchange of cards, or endorsement, the result of a unilateral transaction. If a card is designated a connection and a match is found, the system automatically connects the two users. In one embodiment, the present disclosure involves a mechanism for establishing initial connections for a social network member using a unique mechanism and methods that establish virtual representations of the offline networking represented by business cards the user has collected and scanned at signup. In one embodiment, a new user may scan physical business cards he or she has collected to establish virtual representations of the offline networking represented by the cards he or she has collected. This allows a new user to establish an initial set of connections and endorsements.

In one illustrative example in accordance with certain embodiments, a new employee at a firm meets a colleague for the first time and exchanges physical business cards with that colleague. The new employee may later scan the business card into the system using his or her mobile phone, designate the exchange a bilateral exchange, and then the system would check that they were both part of the same firm and then the system would automatically exchange virtual business cards between the users, without requiring the colleague to approve the transaction. If the new user received a card from a member of a different firm, the system may initiate the bilateral exchange but require verification from the member of the different firm before transferring cards. Even in this case, the system does not require the new user to search for the member of the different firm since the extracted information is used to search automatically, thus avoiding redundancy by not requiring the real-world networking to be repeated online.

Figure 7:
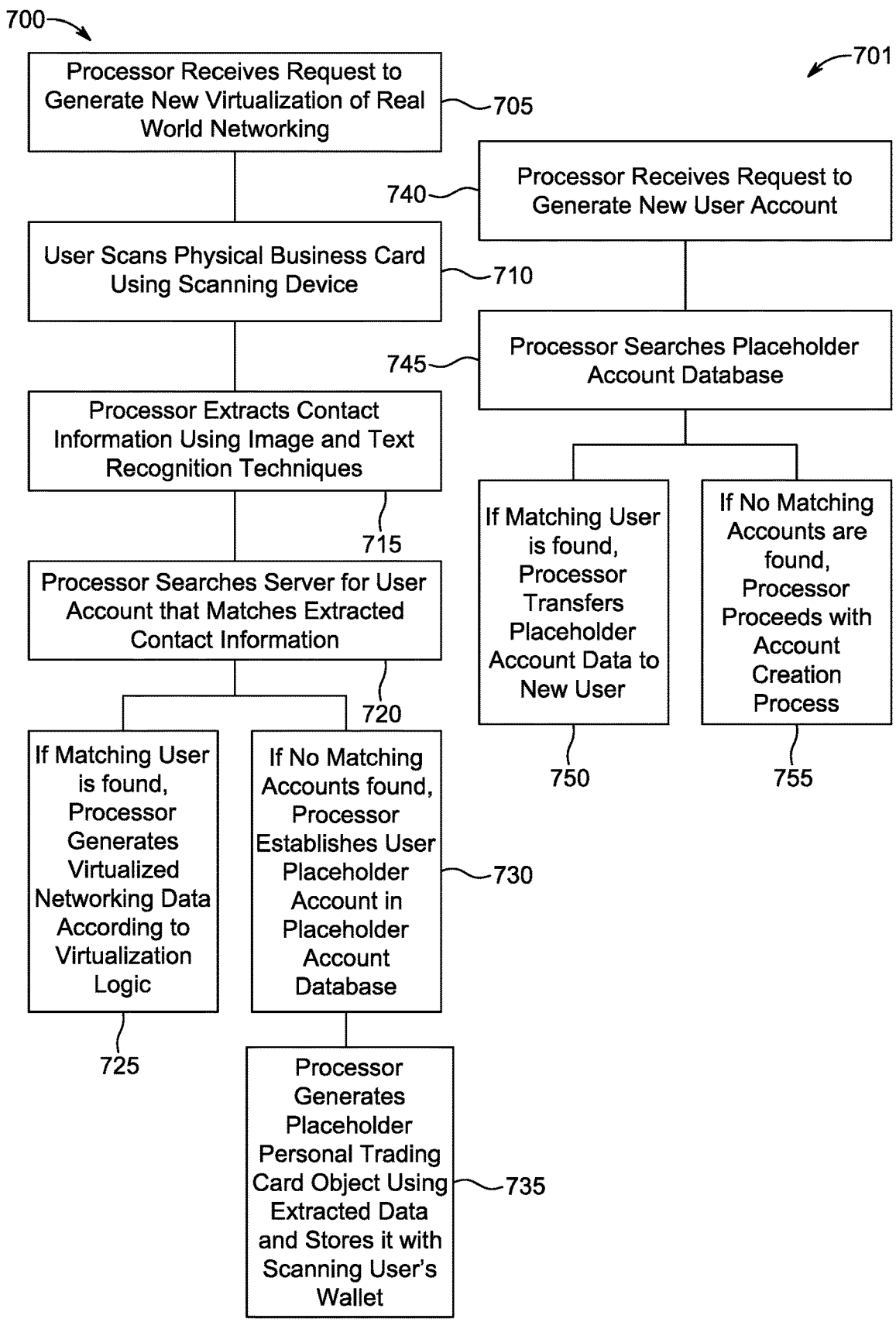
FIG. 7 shows an exemplary placeholder account creation process and placeholder account search process.

FIG. 7 shows an illustrative representation of an exemplary process for establishing placeholder accounts and for utilizing placeholder accounts when a new user signs up. In particular, FIG. 7 shows a detailed illustrative implementation of exemplary placeholder account creation method 700 and exemplary placeholder account search method 701 in accordance with some embodiments. As shown in FIG. 7, in exemplary placeholder account creation method 700 a processor receives a request to generate a new virtualization of offline networking 705; a user is prompted to scan a physical business card using a scanning device 710; a processor extracts contact information using image and text recognition techniques 715; a processor searches for user accounts that match the extracted contact information 720; if a matching user is found, a processor generates virtual networking data that represents the offline business card transaction according to virtualization logic 725; if no matching accounts are found, processor establishes user placeholder account in placeholder account database 730; and processor generates virtual placeholder trading card object using extracted contact data and stores it in scanning user's wallet 735. In some embodiments, scanning user is then able to pass along the placeholder trading card in a manner similar to non-placeholder personal trading cards. In other words, scanning users may still pass on placeholder cards, which represent non-members, as a form of recommendation. In some embodiments, placeholder endorsement data is stored for the placeholder account based on placeholder personal trading card transactions. In some embodiments, this placeholder endorsement data is used in a reputation system. In some embodiments, if no matching accounts are found, the system stores images of the scanned business card in the scanning user's wallet. In some embodiments, the placeholder account database is located in a distinct memory whereas in some embodiments placeholder account data is stored within the user database with an indicator that it is placeholder data. In some embodiments, the placeholder account creation process includes an additional user verification step in the case that more than one potential match is found or that no direct match is found but several similar ones are found. In both cases, the user may be prompted to select matching account from a list of potential matches.

FIG. 7 also shows a detailed illustrative implementation of exemplary placeholder account search method 701 in accordance with some embodiments. As shown in FIG. 7, in exemplary placeholder account search method 701 a processor receives request to generate a new user account 740; a processor searches placeholder account database for matching users 745; if a matching placeholder account is located, a processor transfers placeholder account data to new user 750; and if no matching user accounts are found, processor continues with account creation process 755. In some embodiments, if a matching placeholder account is found the new user is prompted to verify whether the account is a true match by accepting or denying the transfer of placeholder data. In some embodiments, the system sends a verification code or link to the email address or phone number associated with the placeholder account in order for the new user to prove he or she has access to the placeholder account's communication channels and thus indicate he or she is the owner of the placeholder account. In some embodiments, the transfer of placeholder data includes automatically making connections and endorsements between the new user and users who have received and sent the matching placeholder personal trading card. In some embodiments, the new user has the ability to replace the placeholder personal trading cards in the system with the user's new non-placeholder personal trading card, which may include asking user to approve or deny all existing transactions involving placeholder account.

In one illustrative example in accordance with certain embodiments, a new employee at a firm may begin meeting colleagues and passing out his or her physical business card before he or she signs up for the online social networking system. Colleagues may scan the user's card into the system before new user joins and a placeholder account would be created, which would ensure the automatic transfer of those transactions to the new user once he or she signs up. If the new employee passes out his or her card to employees at another firm who then scan the cards, placeholder cards may still be generated but the transfer may require verification rather than occurring automatically.

The system involves another method to translate offline networking into the social networking environment by easily making social network connections with people who are met in non-virtual settings. In addition to using Bluetooth, wireless, and QR codes to connect, the present disclosure includes a method for using facial or voice recognition to make a connection using mobile devices. For example, if a user meets another user, she/he may point camera of her mobile device at the user, and the system will automatically search photos of all users to match using facial recognition, making or suggesting a connection if a match is located. Additionally, she or he may ask the other user to speak into the microphone and the system uses vocal recognition to search for said user. Alternately, the user may speak the name of another user and the system searches for that user.

In addition to providing methods and devices to translate offline networking into the virtual world, the system involves methods to allow online networking to be translated into the offline world, both with regard to members and non-members of the social networking system.

One method to translate online networking into the offline world includes printing a unique identifier that can be scanned, such as a QR code or bar code, on a physical business card or trading card so that members of the social network may easily scan the identifiers to visit another user's social network profile or to establish virtual representations of real-world networking automatically. In one embodiment, scanning the identifier provides access to non-public social network information. If a non-member scans, the system may ask the user if they want to join the social network. The system also includes a method for non-members to scan business cards either using an app or by scanning the QR code, which links to a website that shows additional information about the member whose card was scanned, wherein this information may include reputation information.

Another method to translate online networking into the offline world involves printing a reputation indicator onto physical business card or personal trading card, wherein reputation indicator is based on virtual networking. In one embodiment, there are different categories of reputation for various reputation thresholds with associated indicators, and in this manner a physical business card may indicate which category of reputation a person belongs to. This allows people receiving the physical business card to benefit from the social networking and reputation system without being a member or requiring any virtual action.

In addition to providing methods to share virtual social networking in the offline world, the present disclosure includes methods to share social networking information and profiles virtually outside of the social network.

Figure 8:
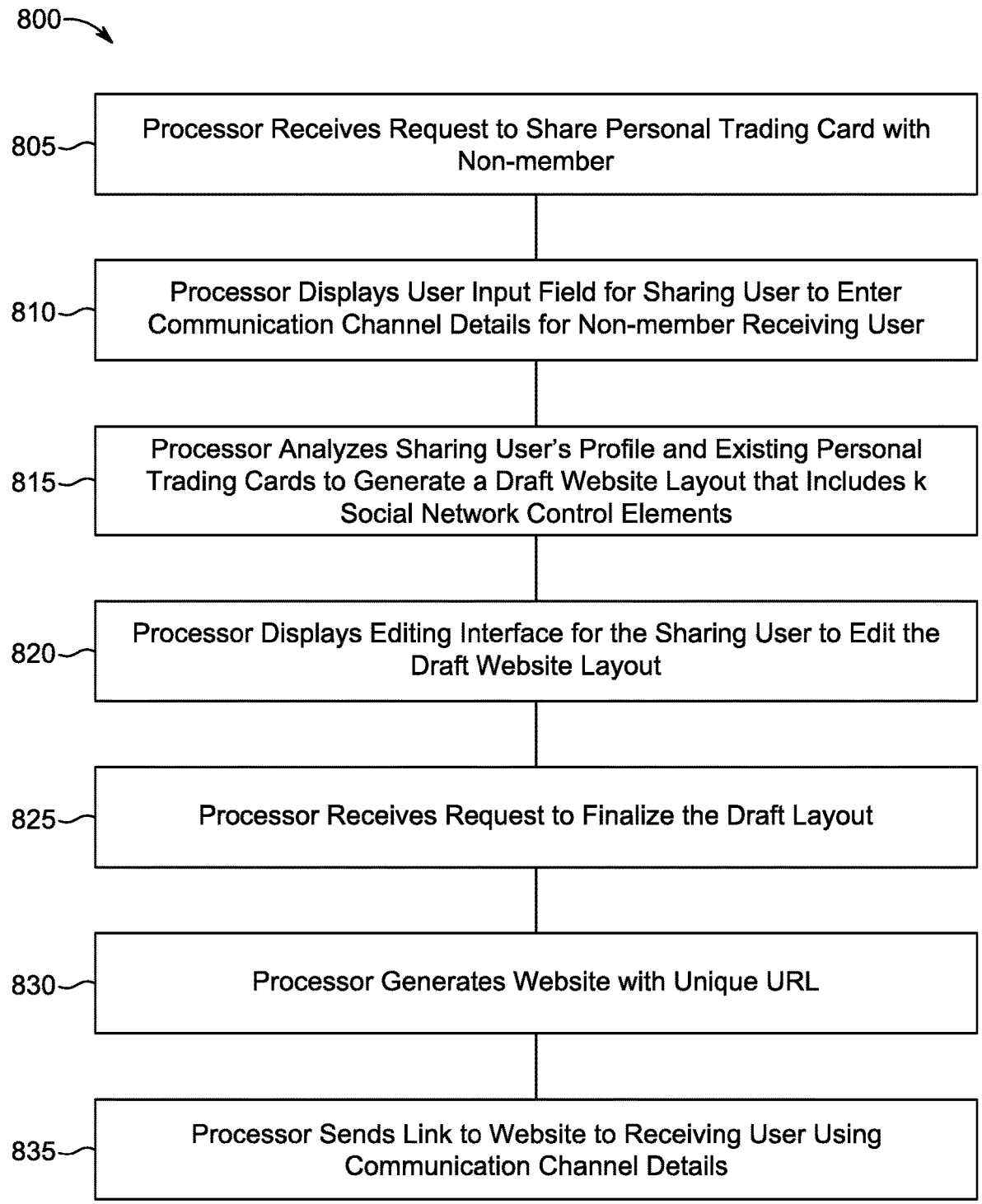
FIG. 8 shows an exemplary automatic website creation process.

FIG. 8 shows an illustrative representation of an exemplary process for automatically generating a custom website based on a user's social network profile. In particular, FIG. 8 shows a detailed illustrative implementation of exemplary website creation method 800. As shown in FIG. 8, a processor receives a request to share a user's personal trading card with a non-member 805, a processor displays a user input field for the user to enter communication channel details for the non-member receiving user 810, a processor analyzes sharing user's profile and existing personal trading cards to generate a draft website layout that displays k social network control elements (each of which may display data from the social network or provide interactive features) 815, a processor displays an editing interface for the sharing user to edit the draft website layout by adding, subtracting, resizing, and/or rearranging the control elements 820, a processor receives a request to finalize the draft layout 825, a processor generates a website to display finalized layout at unique web address 830, and processor sends link to receiving user using communication channel details 835.

Generating a custom website to display a social network profile is powerful because it allows the content and visibility of a given sub-profile to be determined each time a sub-profile is shared with a new user, wherein a sub-profile includes a particular set of profile information. This is better than just allowing non-members to view a profile on a social network, in which just what content is displayed can be controlled, and this is set for all users who visit the profile without being connected. In some embodiments, users are shown a website creation interface that includes a library of profile and social network control elements. In some embodiments, users are given the option to select from a previously-created personal trading card, in which case the system automatically generates a responsive website based on the previously-created card. In some embodiments, users are provided a drag-and-drop interface to edit the draft website layout. In some embodiments, control elements include a social feed that allows anyone accessing the website to comment on and like posts from within the interface. In some embodiments, control elements include a messaging feature that allows anyone accessing the website to send messages or documents to the user directly from the interface. In some embodiments, control elements include computer code to coordinate with accessing user's device, for example in order to upload documents or to record a voice message. In some embodiments, communication channel details may include email, phone number, or various third-party social network accounts. In some embodiments, responsive websites change aspect ratio based on the available screen size of the user. In some preferred embodiments, the websites created by a user update automatically when underlying social network data is updated. It should be understood that this method applies to sharing any social network profile via an automatically-created, responsive website and is not limited to electronic business cards.

Another related method involves generating a basic vCard or other electronic business card format from a social networking profile. Though much of the richness of functionality is lost, cards exported in this format may include a link to the entire profile as a URL element. This export function allows users to share information with existing contact management systems.

Figure 9:
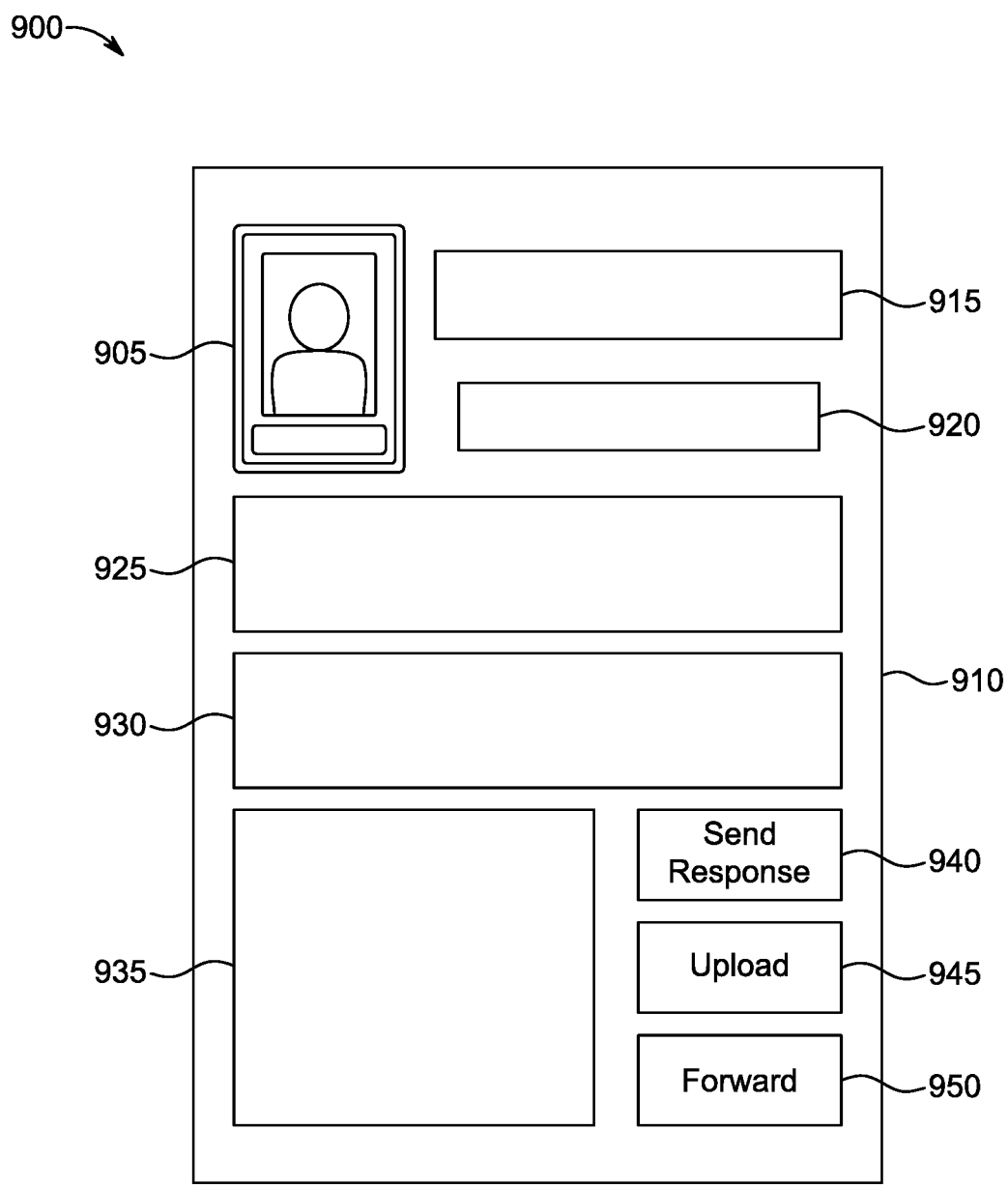
FIG. 9 shows an exemplary request card.

The present disclosure includes improved systems and methods for requesting information from members and non-members of the social network using tradeable request cards, which are a particular type of electronic trading card that allow users to ask questions and request responses. FIG. 9 shows an illustrative representation of exemplary request card 900. As shown in FIG. 9, exemplary request card 900 includes card creator icon 905 (which displays the image and basic information of the user who created the card, which may be in the form of a personal trading card icon), request card background 910, request card name 915, summary data 920, request description 925, request response field 930, request card transaction history 935, send response button 940, upload button 945, and forward button 950. In some example embodiments, a manager interested in hiring a new employee may request recommendations from people in her/his firm or at other firms. Request cards can be passed on multiple times, so that one's first degree connections can share with their connections, and so on. In some embodiments, the sequence of request cards is tracked so that request card paths may be calculated. In some embodiments, a requesting user may request that other users share personal trading cards they have collected with the requesting user, for example when looking for recommendations on who to hire. Request cards can be sent to multiple users at a time, though each request is given a unique identifier so that it can be tracked. In some embodiments, response includes fields for name and contact information. In some embodiments, response includes sharing a personal trading card of the responding member.

In some embodiments, users are able to forward request cards to members of the network as well as non-members using the website creation methods described above. In some embodiments, each forward request to a non-member is logged with a unique identifier and when the corresponding unique URL is accessed the system stores data on the transaction including the recipient. In some embodiments, sharing a card with a non-member includes inputting non-member's name and communication channel details, and thus the system can store identifying data on the receiving non-member even if he or she does not provide it. In some embodiments, request cards include a front and back side accessible via a toggle switch. In some embodiments, summary data includes the time the card was created, the number of responses it has received, and the number of times it has been forwarded. In some embodiments, request cards are treated as a special type of electronic trading card and are treated similarly to personal trading cards in relation to the endorsement path generation and reputation systems and methods described below.

Endorsement Paths

Among the features of the present disclosure is a system to track users to whom endorsements are made visible, in addition to storing information on the subject of endorsements and the users making endorsements. In other words, the disclosure involves tracking the path of an endorsement over time. Users who have received an endorsement of a subject user can in turn make an endorsement of the subject to another user. This is the virtual equivalent of making an introduction or recommending a contact to another person. In some embodiments, the disclosure involves tracking recipients of electronic trading cards. Tracking the recipients allows the system to measure the endorsement path for each subject user over time, wherein each endorsement path is a unique set of users who have received and sent endorsements of the subject user to one another sequentially. In some embodiments, endorsement paths may be analyzed to retrieve information on comprising members and group-level analytics may be calculated for the members of each endorsement path. In some embodiments, endorsement paths are generated in response to a user request and in some embodiments endorsement paths are generated in response to a system request, such as requests from processors configured to calculate network significance and reputation.

Figure 10:
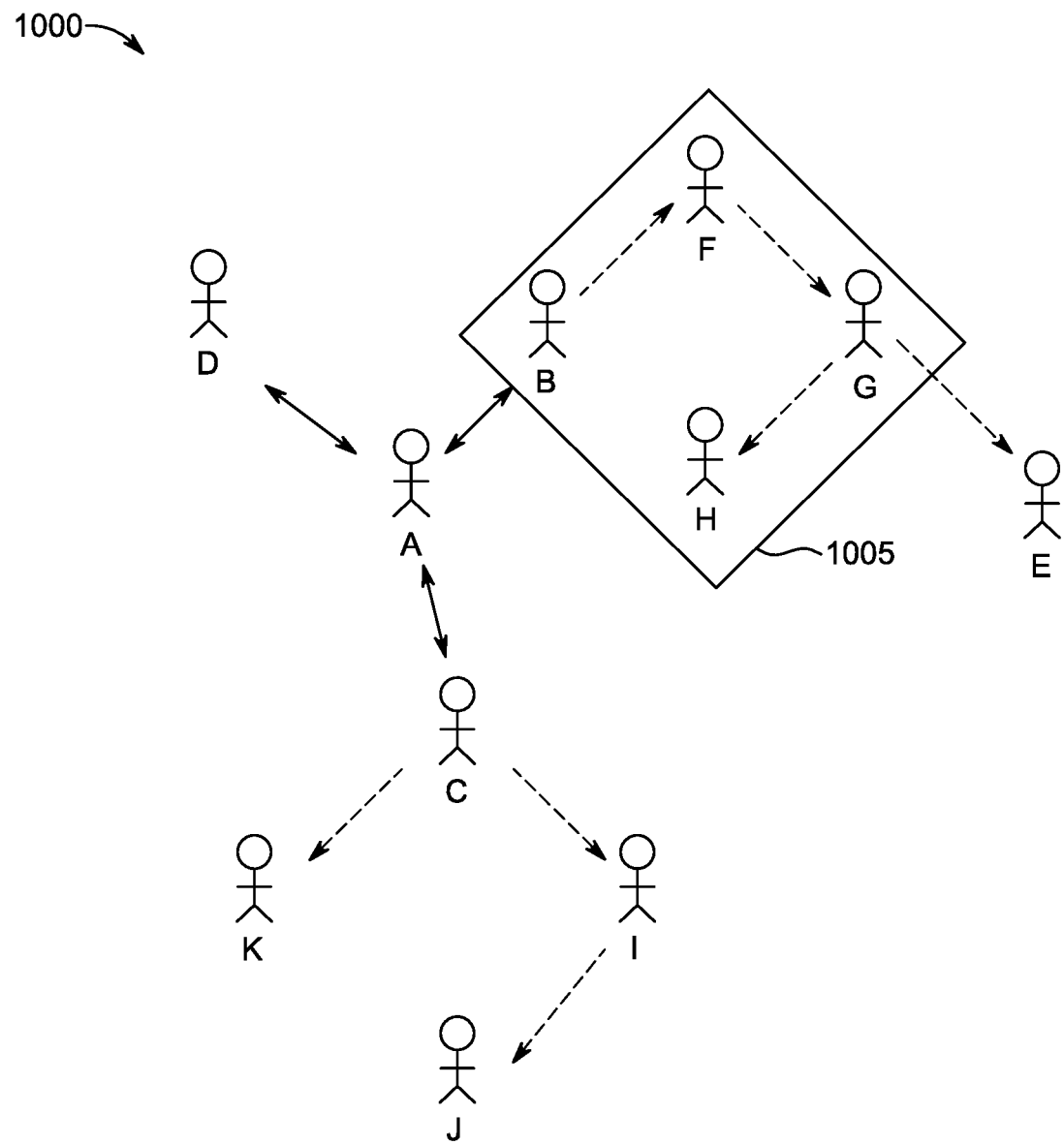
FIG. 10 shows an exemplary set of endorsement paths.

FIG. 10 shows an illustrative representation of an exemplary set of endorsement paths generated for a given user. In particular, FIG. 10 shows a detailed illustrative implementation of exemplary endorsement path set 1000 in accordance with some embodiments. Exemplary endorsement path set 1000 illustrates the sequence of transactions involving the personal trading card of a subject user A. Two types of transactions are illustrated: bilateral exchanges, which are represented by solid lines with arrows on both ends (shown between subject user A and users B, C, and D); and unilateral passes, which are represented by dashed lines with arrows on the end of the receiving user (shown, for example, between user B and user F). Exemplary endorsement path set 1000 also shows endorsement path 1005, which is one specific endorsement path from the set of endorsement paths shown for user A. Endorsement path 1005 includes users B, F, G, and H. In some embodiments, endorsement paths are represented within the system as the group of users who comprise the path along with a sequence indicator. In some embodiments, each user is stored within the endorsement path group object with an indicator of its position within the endorsement path. In some embodiments, every endorsement path begins with the subject user passing his or her own card bilaterally or unilaterally to a receiving user. It should be understood that the endorsement paths shown in FIG. 10 are depicted in an exemplary but non-limiting social networking environment, and that the disclosure also includes any type of social network endorsement that has visibility settings.

In some embodiments, such as those FIG. 10 is consistent with, a given endorsement path includes a unique set of users who have sent and received cards, which means that for every user who has passed a card on more than once (or endorsed a user more than once) a separate endorsement path is generated (for example, user G also passed user A's card to user E, which means another endorsement path for user A includes users B, F, G, and E; in this example there are three other endorsement paths in addition to the two already mentioned, one of which includes users C, I, and J, one of which includes users C and K, and one of which includes user D). In some embodiments, a given endorsement path includes first endorsement degree to N-endorsement degree users, wherein first endorsement degree users are the set of users to whom the receiving user passes the cards, second endorsement degree users are the set of users to whom first endorsement degree users pass the card, and so on. In other words, in such embodiments, endorsement paths include all branches that stem from the main endorsement path, meaning each receiving user is only represented once (for example, in endorsement path set 1000 a single endorsement path would be initiated by user B and would include users B, F, G, H, and E; and only two other endorsement paths would exist, one consisting of users C, I, J, and K, and the other consisting of user D). In some embodiments, if the subject user passed along his or her card unilaterally, the resulting endorsement paths may also include the subject user in the group of comprising users.

Figure 11:
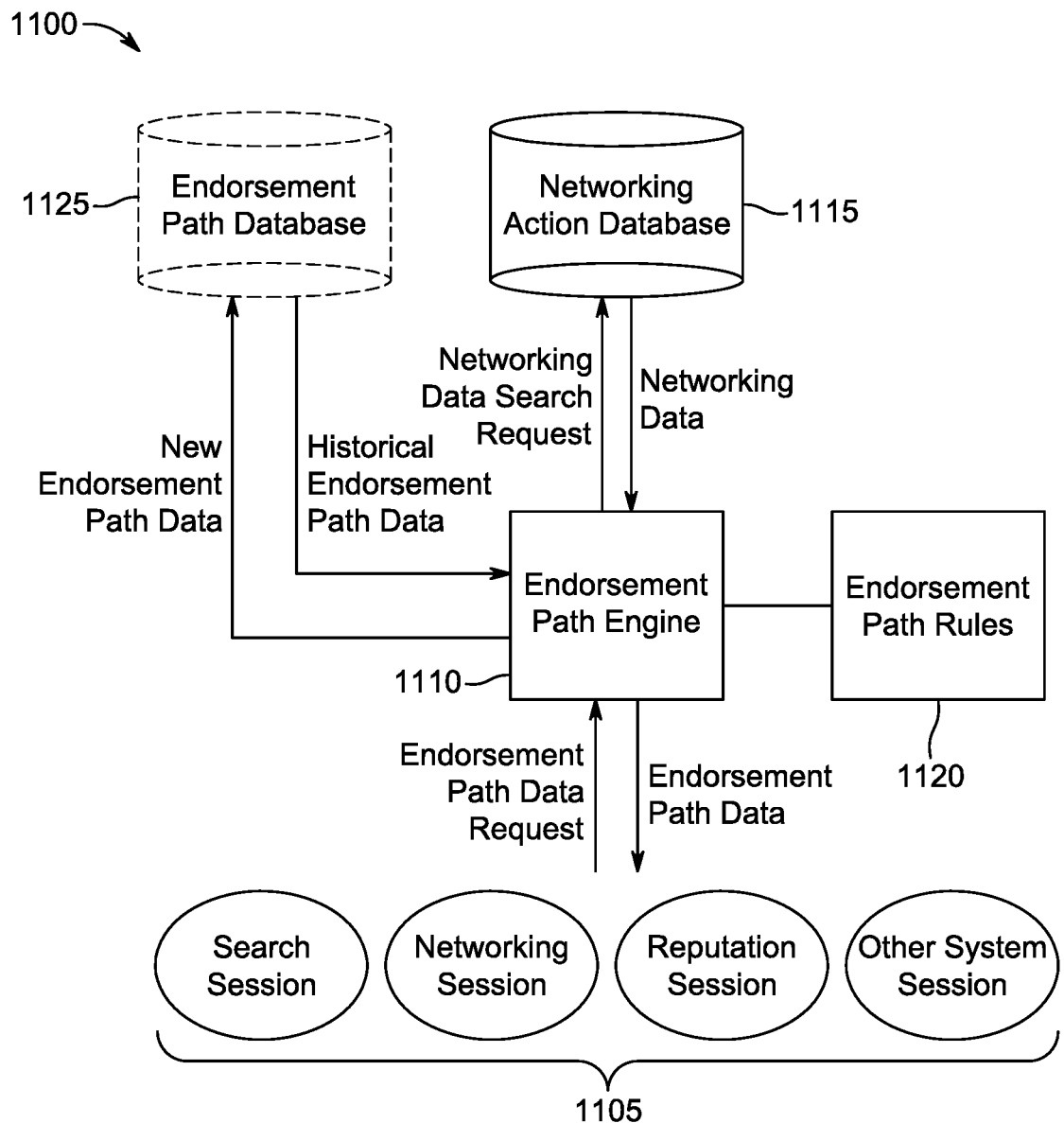
FIG. 11 shows an exemplary endorsement path generation system.

In some embodiments, endorsement paths are used to identify the degrees of endorsements between users. For example, if user X unilaterally shares her card with user Y (in other words, if user X endorses herself to user Y), and user Y then passes the card along to user Z, X and Z may be said to be connected by a two-degree endorsement path. For another example, if user X bilaterally shares her card with user Y (in other words, if user X connects with user Y), and user Y then passes the card along to user Z, X and Z may be said to be connected by a one-degree endorsement path. In some embodiments, a bilateral exchange may be considered a form of endorsement in addition to a form of connection, and in such cases X and Z may be said to be connected by a two-degree endorsement path regardless of whether X unilaterally or bilaterally shared her card with Y, who then passed the card on to Z. These examples are non-limiting and are meant to illustrate the flexibility of the endorsement path system, which is depicted in FIG. 11 and described in more detail below. In some embodiments, endorsement paths are generated in response to a search request wherein a searching user looks up a target user. Endorsement paths may be generated for both searching and target user to see if either appears in the other's endorsement paths. In some embodiments, the shortest endorsement path between the two users, measured by degree of endorsement, is identified. In some embodiments, an endorsement distance score is generated, which involves analyzing each user's endorsement paths to see if the other user's N-degree connections are in any paths. A given user's first-degree connections are those to whom he or she has connected, and his or her second-degree connections are those to whom the first-degree connections are connected, and so on. In some embodiments, an endorsement distance score also involves generating endorsement paths for each user's N-degree connections in order to determine if the other user shows up in any of those paths. Endorsement distance scores give a robust indication of how close two users are within a given network and (by including analysis of each user's N-degree connections) can account for the cases where two users do not show up in any of the other's endorsement paths.

FIG. 11 shows an illustrative representation of an exemplary endorsement path generation system. In particular, FIG. 11 shows a detailed illustrative implementation of exemplary endorsement path generation system 1100 in accordance with some embodiments. As shown in FIG. 11, exemplary endorsement path generation system 1100 includes endorsement path engine 1110, which receives endorsement path requests from other parts of the social networking system 1105, and searches a networking action database 1115 for all networking actions involving the target(s) of a given endorsement path request, and uses endorsement path rules 1120 to generate an endorsement path and then sends new endorsement path data to endorsement path database 1125. In some embodiments, endorsement path database 1125 is temporary, which means endorsement paths are calculated and stored for a given length of time before being deleted, which allows time for them to be analyzed and for group-level statistics to be calculated. In some embodiments, endorsement path database 1125 is a designated memory location within another database. In some embodiments, endorsement path engine 1110 retrieves timestamp information for each of the networking data retrieved from networking action database 1115 and uses endorsement path rules 1120 to determine the sequence of each endorsement path. In some embodiments, networking action data includes connections, endorsements of target user, endorsements received by target user, and endorsements sent by target user. In some embodiments, networking actions include connections and endorsements, and each endorsement is stored with a timestamp, a subject user, a sending user, and one or more receiving users, wherein the receiving users are those to whom the endorsement is made visible. In some embodiments, card transactions are stored as endorsements.

The present disclosure discloses systems and methods for storing social networking information in a database that facilitates tracking paths of endorsements, which may take a number of forms including a relational, graph, and unstructured database. This includes storing a plurality of networking actions between members of a social networking system in a memory location. In some embodiments, endorsement path engine 1110 communicates with a user database (not shown) and a reputation database (not shown) in order to look up information about users involved in each endorsement path.

In certain embodiments, additional information is calculated and stored with the endorsements at the time of each endorsement, which may include the time, endorser, endorsee, recipient, and reputation of all parties involved in the endorsement, among other data about the parties involved (e.g. the network proximity between endorsee and recipient). Other data that may be calculated and stored at the time of an endorsement includes: calculating endorsement speed for a given endorsement path in a given time period or rate at the time the endorsement was made, analyzing the relationship between an endorser and a recipient and storing indicator of the influence differential, measuring diversity of the people who comprise the endorsement path and storing diversity indicator, storing an indicator of whether endorsements are made to people who are already connected to the target or those who are not connected.

According to some embodiments of the disclosure, a processor analyzes the plurality of networking actions involving receiving users and target member to generate endorsement paths for target member, and stores the groups of users that comprise each endorsement path in a temporary memory location. Calculating endorsement paths at runtime uses less memory than storing endorsement path data in a more permanent memory location. In some embodiments, however, endorsement paths are stored in a distinct database and updated automatically as networking actions occur. In some embodiments, the system stores a grouping of users that represent each endorsement path that are updated constantly as new networking actions occur. This can be preferred in certain situations, such as within a firm when a network has a limited number of users, because it is faster to analyze. The present disclosure includes another method for saving memory even in embodiments when endorsement path members and group-level analytics are stored in an ongoing manner: endorsement paths may be calculated for each user and updated in an additive manner, wherein the most recent version of the user's endorsement paths are updated every time a new endorsement of the subject is made, but the system only adds new users to an endorsement path group, it does not subtract. This has two advantages: first, less processing power is needed since the system does not need to calculate the endorsement paths each time a new endorsement occurs, but simply adds the newest one. The second advantage is that even if a user deletes an endorsement or deletes his or her account, the endorsement is still represented in the path.

The disclosure includes improved systems and methods for searching for users within a social network. In some embodiments, users are provided a search interface that allows them to search for other users based on name and attribute, such as to search for users who have the same job title or who are paid within a given range. In some embodiments, the search interface includes features to share cards with users that show up in the search results. In some embodiments, the system calculates search scores for users, wherein search scores involve a combination of calculating endorsement path distance between users and calculating how close the user matches the search terms. In some embodiments, search results are ranked based on search scores. In some embodiments, the system includes displaying additional information about the connection and endorsement paths between the matching user and the scanning user. In some embodiments, endorsement paths of a given user are visualized as a node graph. In some embodiments, a display profile is created for users that show up in the search results, the display profile including additional information about each user and the associated search score.

In one illustrative example in accordance with some embodiments, when two people meet in the physical world, one person may later search for the other person on a social network with the goal of seeing if and how they are connected. In some embodiments, users are provided an interface to search for others or to scan physical business cards to initiate a search. In some embodiments, the system analyzes endorsements of the second user to see if anyone in the first user's N-degree network have received endorsements of the second user. The system also sees if any of the first user's N-degree contacts have been endorsed to the second user. The first and second users might not be connected by anything other than endorsements, or there may be so many connection path links between them that connection paths do not convey much information. A processor then generates visualizations of the endorsement paths for the second user, including details about any endorsement paths that exist, including summary group-level statistics for each path. The present disclosure allows users to see indicators of both their own and other users' endorsement paths. These representations may be numeric (such as the count of degrees separating two users) or visual (such as a dynamic graph of who has endorsed a given user). In some embodiments, the searching user may be shown a reputation score based, in part, on endorsements made by and of the target person. In some embodiments, endorsement paths may be displayed with a time indicator that allows users to see how an endorsement path grew over time.

Endorsement paths take advantage of the system's interface for sharing social network profile information and electronic trading cards with people outside of the system. Specifically, the system involves adding a unique URL parameter to URL links where cards are hosted. The system also logs each request to share a card with a third-party user, and counts this as an endorsement. When a non-member loads the URL version of the card, the system tracks this via the URL parameter. In one embodiment, the system includes adding a unique URL parameter onto the card link each time a receiving user sends a card to someone else, so that users loading those pages can be tracked, and in this way those transactions stored. Loading the page includes an option for the recipient to pass along the card again, and in this case the system could add another URL parameter that would track this transaction. This allows the system to keep track of endorsement paths involving multiple sequential endorsements made by non-members. Even if the URL link is not sent through the interface, meaning no unique parameter is added, the same link being opened from a new IP address means that the number of times it is passed on may still be calculated. In one embodiment, users are able to input the name of the person to whom they are sharing and therefore the user can be logged as a placeholder profile. If such a user ever joins and develops a reputation, then the placeholder profile can be replaced with a full profile.

The present disclosure includes a mechanism to alert the person to whom an endorsement has been made visible about the endorsement. This is helpful because the present disclosure allows users to receive endorsements of users they have never met, whereas in existing systems, one has to first know of a user in order to see his or her endorsements. In existing social networks, users may make endorsements of a subject user, but these are stored with the subject user. This means that to view the endorsements another user must know of the subject and navigate to their profile. In the present system, however, endorsements are sent to and stored with receiving users. This means that a user may receive an endorsement of someone they do not already know. This is an improvement on the operation of a social network because it makes it easier to suggest connections and make recommendations. This also creates a new type of connection and thus a richer fabric of relationships. The user who is being recommended may be notified or not notified in various embodiments of the disclosure. Users have the option to add a comment or rating when passing along a card, which similarly can be made visible to either the recipient and/or the target. Users may also be able to see for a given user: endorsements that user has received, endorsements that user has made, the people who have endorsed that user, and those who have received endorsements of that user.

The disclosure includes a method to suggest connections to users based on endorsement paths. The ability to pass along cards unilaterally means that two people can both have received the other person's card without bilaterally connecting. The system can recognize this and suggest that these two users connect (which may convey additional permissions to view and interact with each other's profiles, such as the ability to see all the cards that the other has collected). Additionally, the system may show a user all those who have been endorsed to user's first and X-degree connections, meaning that higher-degree endorsement connections may be suggested. The system also can show people to whom a user has been endorsed, and suggest connections that way. Additionally, information about the set of endorsements received by a user may be taken into account. For example, if two users have both received many similar endorsements, they may be interested in being connected or knowing more about the other. Users are provided an interface to search for connection suggestions using a number of parameters. Additionally, project, group, skill, and commemorative cards may be used to suggest connections. For example, if two users worked on the same project or have similar skills, the system may suggest that they exchange cards.

The present disclosure includes improved systems and methods for regulating social network profile visibility based on endorsement data and endorsement paths. This provides a secure way to share information, including non-public information, when making an endorsement.

In some embodiments, users set viewing permissions for electronic business cards, defining which aspects of the business card and profile are displayed based on attributes of the viewer. This method of setting card visibility based on viewer attribute is more secure than setting visibility at the card level, as in existing systems, because it controls visibility based on how the viewer is related to the card owner rather than granting the same viewing permissions to any recipient of a given card. For example, if a user passes on a card to someone who has no mutual connections with the card owner, the card may be hidden. This method also is more flexible (and potentially more powerful) than setting visibility for specific users or groups of users, as in certain existing systems because requesting users do not have to be known to the target user in order to be granted permission based on user category. Viewing permissions can be set based on user affiliation (such as employees at a given company), by defining user groups manually (giving specific users various permissions), by profile similarity (such as how if two users have received a high number of the same cards), by degree of connection removed from card owner (such as the connections of one's connections), and by degree of endorsement removed from card owner (such as people to whom the user's card has been shared), or a combination thereof. Allowing card visibility permissions to be set based on the degree of endorsement that a given user is removed from a target is more secure than setting visibility at the card level, since instead of a given card type having a certain amount of information visible to everyone, visibility changes as the card is passed on unilaterally along endorsement paths.

Figure 12:
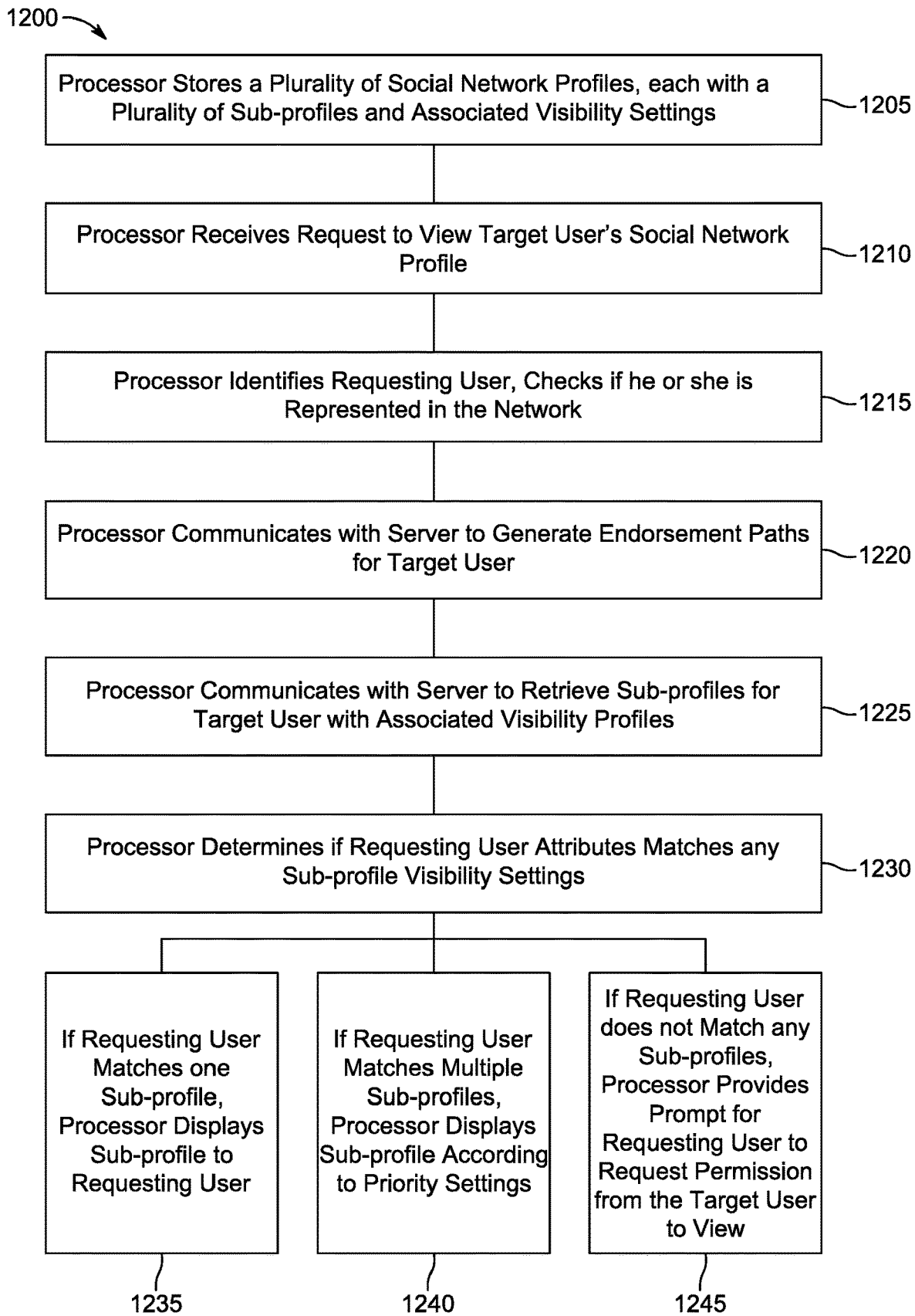
FIG. 12 shows an exemplary social network profile visibility management process.

FIG. 12 shows an illustrative representation of an exemplary social network profile visibility management process. In particular, FIG. 12 shows a detailed illustrative implementation of exemplary social network profile visibility management process 1200 in accordance with some embodiments. As shown in FIG. 12, exemplary social network profile visibility management process 1200 includes a processor that stores a plurality of social network profiles (each with a plurality of sub-profiles, each of which display a subset of profile elements and have associated visibility settings) 1205, a processor that receives a request to view a target user's social network profile 1210, a processor that identifies the requesting user and checks if he or she is a member of the network 1215, a processor that communicates with server to generate endorsement paths for target user 1220, a processor that communicates with server to retrieve sub-profiles of target user and associated visibility settings 1225, a processor that determines if requesting user attributes match any sub-profile visibility settings 1230. If requesting user attributes match any sub-profile visibility settings, exemplary social network profile visibility management process 1200 includes a processor that displays sub-profile 1235; if requesting user matches multiple sub-profiles, a processor selects and displays one sub-profile based on priority settings (or, as a default, displays sub-profile with the most elements) 1240; and if requesting user does not match any sub-profiles, a processor provides a prompt to the requesting user for him or her to request permission to view the profile from the target user 1245. In some embodiments, sub-profile visibility settings are based on user categories including endorsement path distance.

The present disclosure's unilateral passing on of a personal trading card is unique in that receiving a card gives recipients the ability to pass on cards that they have received. In other words, receiving a card does not just make another user's non-public profile information visible to a recipient, but allows the recipient to pass along that card and to share non-public information with other users. It effectively gives recipients of recommendations the ability to update viewing permissions of a target user's profile, and this risk means that each recommendation requires more trust than in existing systems. In other words, the present disclosure involves setting viewing permissions automatically based on receipt of a given electronic business card (or other form of endorsement). The amount of non-public information that recipients can share may be defined by the card owner, and different versions of a personal trading card may have different privileges. The ability to update visibility by passing on a card may be set based on a user's attributes (including user affiliation, degree of connection user is removed from target, degree of endorsement user is removed from target). For example, these privileges may be different for cards received during bilateral and unilateral transactions: a recipient of a card in a bilateral exchange may be able to pass along that card a greater number of times than the recipient of a unilateral card, and may be able to share more of the card owner's non-public profile information. Additionally, the number of display and control elements displayed on a given card may change based on how far removed a sending user is from the card owner based on degrees of connection and/or endorsement. For example, a unilateral card recipient may only be able to share limited cards, due to the disclosure's system for setting card visibility at the degree of endorsement removed level. Receiving a card unilaterally may involve sharing a basic card first, and requiring permission to be granted explicitly to see the full card. The ability to pass along a card may be limited to a certain number of degrees away from a user by endorsement or connection.

Network Significance-Based Reputation System

It is helpful for online social networking environments to foster an environment of trust by providing features that allow users to evaluate other users, such as by establishing a reputation score. The present disclosure includes improved systems and methods for measuring social network significance for a given user or tradeable electronic card within a social networking environment. The present disclosure also includes improved systems and methods for utilizing network significance scores in the calculation of reputation for a user or card. It should be appreciated that the example of a tradeable electronic card is non-limiting, and that the disclosure applies more generally to calculating network significance for a user based on endorsements, wherein each endorsement has a set of users to whom it is made visible.

Figure 13:
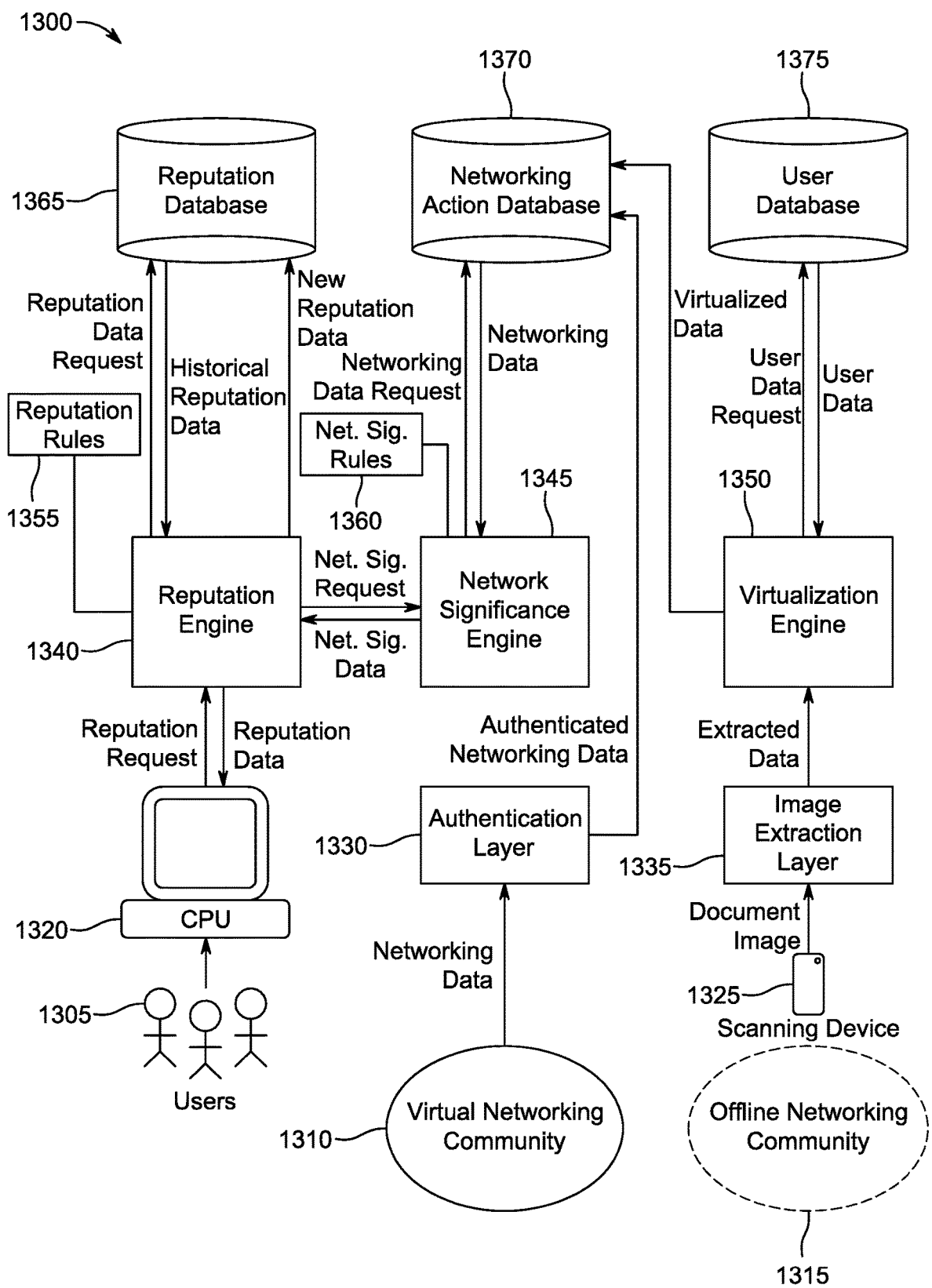
FIG. 13 shows an exemplary reputation system.

FIG. 13 shows an illustrative representation of an exemplary reputation system in accordance with some embodiments. In particular, FIG. 13 shows a detailed illustrative implementation of exemplary reputation system 1300 in accordance with some embodiments. As shown in FIG. 13, exemplary reputation system 1300 includes reputation engine 1340, network significance engine 1345, virtualization engine 1350, reputation rules 1355, networking significance rules 1360, reputation database 1365, networking action database 1370, user database 1375, authentication layer 1330, image extraction layer 1335, user computing environment 1320, users 1305, and virtual networking community 1310. Networking data from the virtual networking community are sent to authentication layer 1330 which communicates with reputation engine 1340 to determine if networking data is authentic (this connection is not shown), and authenticated data is then passed on to the networking action database 1370.

In some embodiments, in an illustrative implementation, users 1305 interact with a user interface (not depicted) on user computing environment 1320 to generate reputation information requests that are passed to reputation engine 1340, which communicates with network significance engine 1345, which communicates with networking action database 1370 to generate one or multiple networking significance indicators using network significance rules 1360. In some embodiments, network significance engine 1345 communicates with user database 1375 to retrieve user data for use according to networking significance rules 1360 (this connection is not shown). Networking significance indicators are returned to reputation engine 1340, which then uses reputation rules 1355 and additional reputation inputs including historical reputation data received from communicating with reputation database 1365 to generate reputation data, which is then shared to user computing environment 1320 where it may be stored as local session data and viewed, displayed, manipulated, stored, and printed. In some embodiments, reputation engine 1340 sends new or updated reputation to reputation database 1365 for storage. Not shown in FIG. 13 is the endorsement path engine, which generates endorsement paths for given users, but it should be understood that in some embodiments network significance engine 1345 and reputation engine 1340 are configured to coordinate with an endorsement path generation engine in order to request and receive endorsement path data, which may factor into network significance and reputation computations.

FIG. 13 also shows offline networking community 1315 which is tacitly represented in the system using image extraction layer 1335, which extracts information from artifacts of offline and off-network networking and communicates with virtualization engine 1350, which processes extracted information and generates virtualizations of offline and off-network networking, sending virtualized data to networking action database 1370. Virtualization engine 1350 coordinates with user database 1375 to request for user accounts that match the extracted information and receives user data. Virtualization engine 1350 also can input new data and update data based on extracted data received from the image extracting layer. FIG. 13 also shows scanning device 1325, which is used to provide inputs to image extracting layer 1335 according to the illustrative system depicted. It should be understood that inputs can be provided to the virtualization engine in a plurality of manners, which are described elsewhere in this specification. In one embodiment, the image extraction layer includes a processor with image and text processing capabilities that extracts information from physical business cards that are scanned using scanning device 1325. It should be understood that reputation database 1365, networking action database 1370, and user database 1375 may be designated sections of a single memory location in certain embodiments.

It is understood that the disclosure applies to calculating network significance in response to a user-generated or system-generated request, as well as calculating and storing a network significance score for each user that is updated when a new social networking action involving the user occurs or at a given interval of time. In some embodiments, this involves constantly monitoring social networking actions and updating relevant network significance scores when new actions occur. In some embodiments, the current set of endorsement paths for a given user's card are stored and updated in an additive manner, so that less memory is used to calculate complicated social networking relationships.

Among the features of the present reputation system is the use of information on the recipients of unilateral card transactions in calculating network significance and reputation score. Recipients of a given card may become endorsers if they decide to pass along a card, but for each card for which at least one endorsement has been made there is at least one recipient who is not an endorser, making this a unique pool of users to consider in terms of reputation. There are often multiple recipients who are not endorsers themselves. In some embodiments, the user's network score increases each time the card is forwarded by the sender to the recipient and increases more if the recipient of the target's card has a high influence. This is based on the premise that users are less likely to make invalid endorsements, such as to artificially inflate a friend's reputation, to influential people. Thus, if the sender forwards the target card to two recipients, each with the same influence, the reputation score will increase, whereas the score will increase more if one recipient has a higher influence.

To better understand this feature, consider the following illustrative, non-limiting example, consistent with embodiments where network significance scores have no upper bound and are stored for each user, being updated automatically when new networking actions occur: target user A has a network significance score of 120.8 and has exchanged cards bilaterally with a number of users, including user B (who has a network significance score of 80.5) and user C (who also has a network significance score of 80.5). User B decides to share user A's card with user D (network significance score: 153.0) as a means of suggesting an introduction. When this networking action occurs, the system automatically updates user A's network significance score according to the network significance rules, resulting in an updated network significance score of 121.1. In other words, user B passing on user A's card to user D resulted in a network significance score increase of 0.3 for user A. Now consider user C, who decides to pass on user A's card to user E (network significance score: 85.5). When this occurs, the system automatically updates user A's network significance score (currently 121.1), resulting in a new network significance score of 121.2. In other words, this networking action resulted in a network significance score increase of 0.1 points for user A. Even though both endorsers of user A (user B and user C) had the same network significance score, the endorsements they gave of user A had a different effect on the network significance score for user A because the receiving users had different network significance scores: user E had a lower network significance score than user D and therefore an endorsement made to user E had less of an effect on user A's network significance score. This is consistent with the premise that users who are endorsed to people with high influence tend to be influential. It is worth noting that in certain embodiments, the higher network significance score for user A by the time user C made the endorsement (121.1 rather than 120.8) would also have an effect on the magnitude of the increase. In other words, even if user B and user C passed on user A's card to users with the same network significance scores, the first transaction may result in a slightly greater increase because the marginal effect of networking actions involving user A may decrease as the number of networking actions involving user A increases (in other embodiments, however, the network significance rules may be configured such that the first transaction results in a slightly lesser increase, for example if it is treated as an outlier until the second transaction occurs, which illustrates the flexibility of the network significance rules). It is also worth noting that this is a simplified example and in practice the network significance rules involve a multitude of additional factors related to each networking action, beyond just accounting for the network significance scores of the sending and receiving users. A non-exhaustive list of these additional factors includes: the network significance differential between the sending and receiving user, how closely related sending and receiving users are to the target user within a network, where within an organizational hierarchy sending and receiving users fall, similarity of sending and receiving user to target user, past network behavior of all parties involved in the networking action, previous endorsements made of and by the target user (including average network significance of sending and receiving users), and the endorsement path position for a given networking action. In certain embodiments, endorsements of a target user made to people with low network significance scores may have no effect or even a negative effect on the target user's network significance score.

One additional factor in determining the effect of a networking action on the network significance of those involved for which an example is helpful is the endorsement path position for a given networking action. For example, consider user A (who, after the previous example, now has a network significance score of 121.1), user B (network significance score: 80.5), user D (153.0), and two additional users: user F (network significance score: 80.5) and user G (network significance score: 153.0). User C passes on user A's card to user F (the effect of this transaction on user A's network significance is ignored in this example for simplicity), and user F then passes on the card to user G. As we saw above, when user B passed on user A's card to user D, it resulted in a network significance increase of 0.3 points. However, when user F passes on user A's card to user G, user A's network significance increases by 0.4 points, from 121.1 to 121.5, even though both sending users (user B and user F) had a network significance score of 80.5 and both receiving users (user D and user G) had a score of 153.0. The reason for the difference is that user D was only one endorsement path degree removed from user A whereas user G was two endorsement path degrees removed, and in some non-limiting embodiments the greater the endorsement path distance for a given networking action, the greater the effect on network significance. This is consistent with the premise that users who are endorsed multiple times, and who are endorsed by people who are not closely related to their network, tend to be more influential. It is worth noting that the numeric network significance effects described in the above two examples are provided by way of example and are not meant to limit the system in any way.

Figure 14:
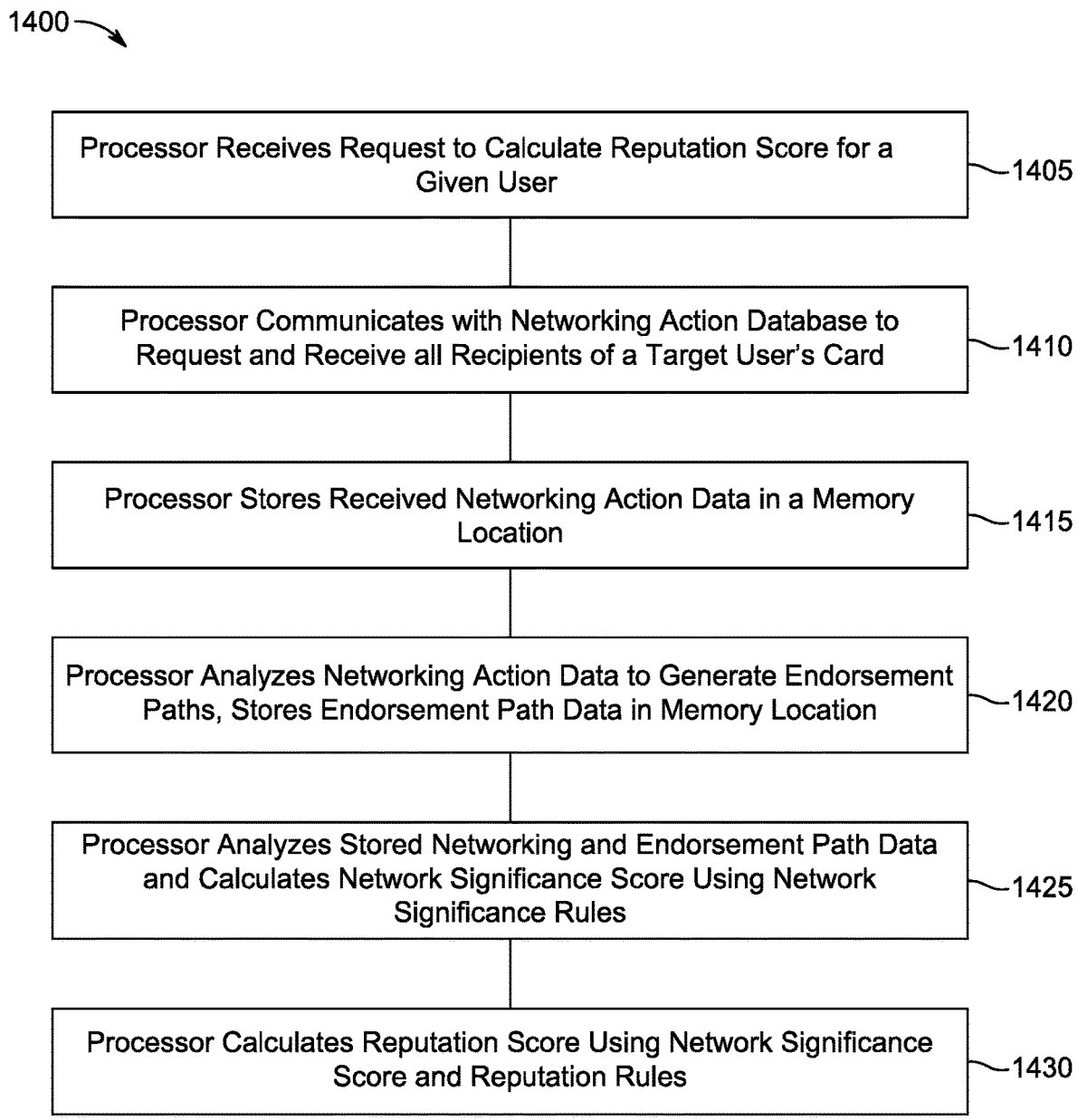
FIG. 14 shows an exemplary reputation creation process.

FIG. 14 shows an illustrative representation of an exemplary reputation generation process in accordance with some embodiments. In particular, FIG. 14 shows a detailed illustrative implementation of exemplary reputation generation process 1400 in accordance with some embodiments. As shown in FIG. 14, a processor receives a request to calculate a reputation score for a given user 1405, a processor communicates with a networking action database to request and receive data on all recipients of a target user's card (or all the users to whom an endorsement of the given user has been made visible) and the networking actions involving those recipients 1410, a processor stores received networking action data in a memory location 1415, a processor analyzes networking action data to generate endorsement paths using timestamps and stores endorsement path data in a memory location 1420, a processor analyzes stored networking data and endorsement paths and calculates a network significance score using network significance rules 1425, and a processor calculates reputation score using network significance score and reputation rules 1430. In some embodiments, social networking data includes both virtual networking actions and virtual representations of offline networking. In some embodiments, a general network significance score may be calculated for a given user or card based on the relationship with that user and the entire network, and in some embodiments network significance can be calculated within various subnetworks, including time-specific subnetworks wherein only networking interactions from within a given time period are accounted for.

It should be understood that the disclosure applies to calculating network significance both according to a rules-based algorithm and according to a machine learning engine that uses raw social networking action data and performance results to generate a score. In some embodiments, performance results are defined in a business context, but the disclosure applies more broadly to endorsements in any social networking environment.

The system stores bilateral and unilateral transaction information along with endorser, recipient, and target user information in electronic databases. In some embodiments, reputation data about senders, recipients, and subjects of electronic trading cards may be stored at the time of the endorsement. In calculating reputation scores, these historic reputation scores or the current scores may be used at runtime. In some embodiments, the system's database of virtual representations of offline networking are used to determine network significance. In some embodiments, these virtual representations are treated identically to virtual networking actions and in some they are given a different weight.

The present disclosure includes a number of improved methods and systems for a more accurate measure of network significance that take advantage of the unique endorsement path systems and methods outlined above.

In some embodiments, groups of users in certain categories of relation to the target user are identified, group-level network significance scores are computed for the identified groups, and these group-level network significance scores are used to compute a more powerful network significance score for said target user. The presently disclosed endorsement path generation systems and methods, in which endorsement visibility is used to determine how a given user (or user's card) is shared through the network, acts as a powerful tool to measure network significance, since it allows for the creation of more categories of users related to the target user than traditional endorsement systems, which generally include just people who are connected to target user and who have endorsed target user. The present disclosure, in contrast, includes methods and systems to identify at least five additional groups of users: those who have received endorsements of the target user, those to whom target user has made an endorsement visible to, those whom target user has endorsed to others, those whose endorsements have been made visible to target user, and those who have made endorsements of others visible to target user. Group-level network significance scores may be calculated for each of the groups described above. These group-level network significance scores are referred to in this specification as collective influence scores. It is understood that the groups of users described above are given as a non-limiting example, and that additional groups of users may be defined based on their relation to the target user. Collective influence scores may be calculated on an ongoing basis, though this may be memory-prohibitive, and may also be calculated in response to a system-generated or user-generated request. In some embodiments, collective influence scores are created for the group comprised of all the identified groups, and in some embodiments, each group is given a discrete score.

Figure 15:
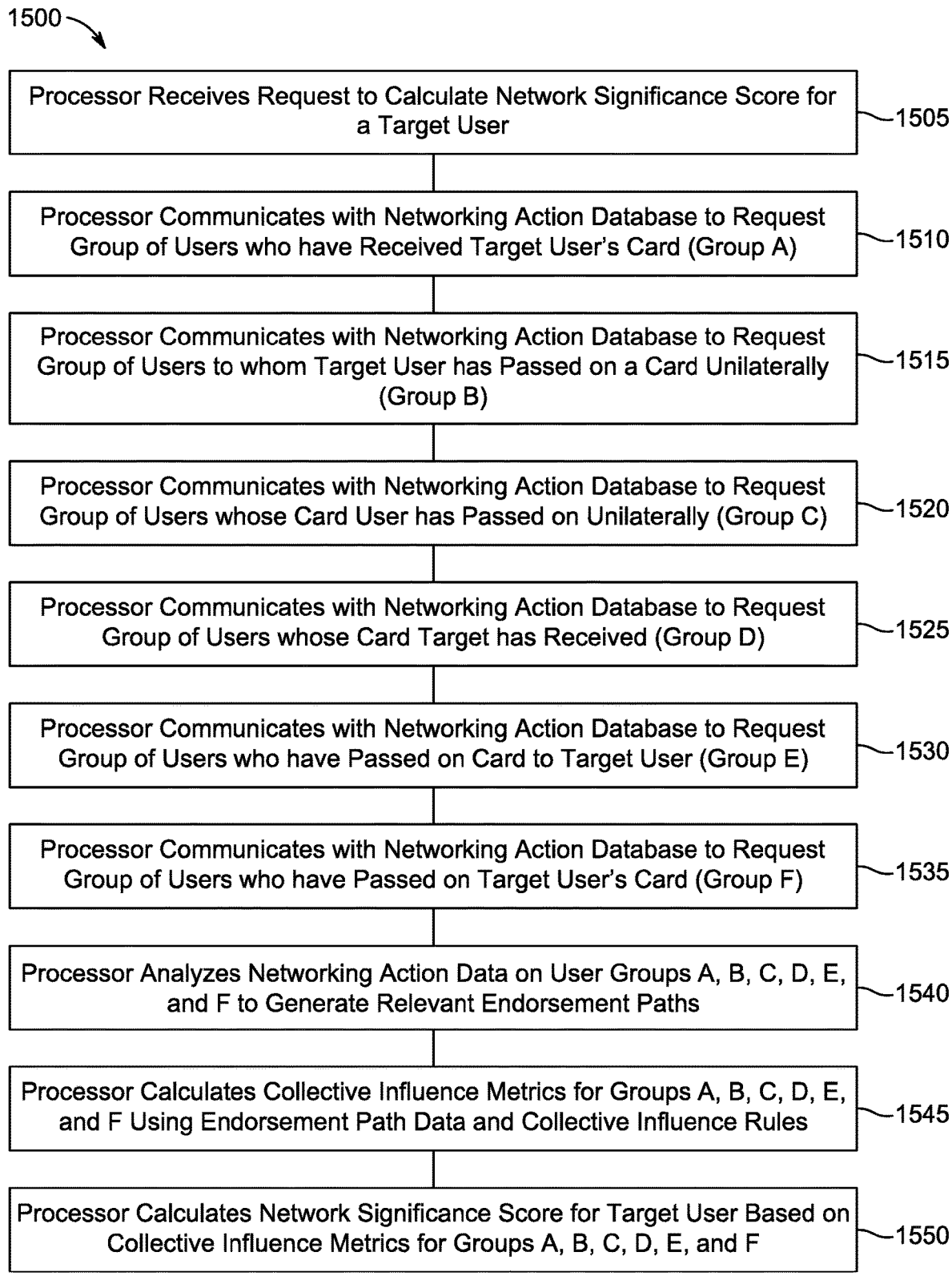
FIG. 15 shows an exemplary network significance score calculation process.

FIG. 15 shows an illustrative representation of an exemplary network significance score calculation process in accordance with some embodiments. In particular, FIG. 15 shows a detailed illustrative implementation of exemplary network significance generation process 1500 in accordance with some embodiments. As shown in FIG. 15, a processor receives a request to calculate a network significance score for a target user 1505; a processor communicates with networking action database to request Group A, the set of users who have received target user's card (based on the premise that people who are influential tend to be recommended to people who are influential) 1510; a processor communicates with networking action database to request Group B, the set of users to whom target user has passed on a card unilaterally (based on the premise that people who make recommendations to influential people tend to be influential) 1515; a processor communicates with networking action database to request Group C, the set of users whose card user has passed on unilaterally (based on the premise that people who recommend influential people tend to be influential) 1520; a processor communicates with networking action database to request Group D, the set of users whose card target has received unilaterally (based on the premise that people who are influential tend to receive recommendations of people who are influential) 1525; a processor communicates with networking action database to request Group E, the set of users who have passed cards unilaterally to target (based on the premise that people who are influential tend to receive recommendations from people who are influential) 1530; a processor communicates with networking action database to request Group F, the set of users have passed on target's card to others (based on the premise that people who are influential tend to by recommended by people who are influential) 1535; a processor analyzes networking action data on user groups A, B, C, D, E, and F to generate relevant endorsement paths 1540; a processor calculates collective influence metrics for groups A, B, C, D, E, and F using endorsement path data and collective influence rules 1545; and a processor calculates network significance scores for target user based on collective influence metrics for groups A, B, C, D, E, and F using networking significance rules 1550.

In some embodiments, collective influence for a given set of users is the average reputation of all members of the group. In some embodiments, collective influence involves weighting reputation of individual members based on endorsement paths. In some embodiments, collective influence takes into account the reputation differential between two users in a path (for example, if a person of lower reputation recommends a target user to a person of higher reputation, this may be considered to have a different weight than if a high reputation user recommends a target user to another high reputation user). It is understood that Group F is differentiated from typical endorsers, because they include people who are N endorsement degrees removed from the target user, which allows a more granular weighting than considering all endorsers of a given user just on the basis of their reputation. In some embodiments, a processor may communicate with a user database as well, since some networking action data is aggregated and stored there and may require less computing power to search (for example, all of the cards a target user has collected). It should be understood that the exemplary networking significance score calculation process shown in FIG. 15 may take place within the reputation score generation process depicted in FIG. 14 as part of the process by which a processor analyzes received networking action data. It should also be understood that the exemplary network significance calculation process laid out in FIG. 15 is non-limiting, and that the calculation of a network significance score can take a plurality of different factors, some of which are laid out below.

In some embodiments, endorsement diversity is calculated and factored into network significance scores. The present disclosure includes endorsement recipients in addition to endorsers in the endorsement paths, which means that each endorsement path has at least one more user than would be in a path comprised solely of endorsers. Endorsement diversity is calculated by analyzing the set of people who have made and received endorsements of a target user. This may be done for all recipients or at the individual endorsement path level. One method of measuring diversity involves calculating how close the network distance is between members of the group. This is based on the premise that endorsements received from a more diverse range of users tend to be more valid than those from closely-related groups. One method of measuring diversity involves counting the number of people in the endorsement path who are in different categories. Categories may include group or personal affinity, network similarity (those who have received similar cards), or profile similarity (such as a similar educational or professional background). Another endorsement diversity measure involves looking at how many recipients were also connected bilaterally to the target user at the time the endorsement was made, as well as how many were not connected bilaterally at the time but made such a connection later on. Another method to calculate endorsement diversity is to count the number of endorsement paths and calculate their length. This is based on the premise that endorsement paths that are longer and/or include more diverse members are more indicative of an influential user. The number of endorsement paths may be calculated by the following formula: Number of endorsement paths=K+B, where K is the number of times a target user's card is passed along more than once by a user (in other words, the number of branches started by card recipients) and B is the number of times a target user passed on his or her own card (in other word, the number of branches started by the target user). In effect, counting the number of branches gives you the number of endorsement paths.

In some embodiments, network significance scores also take into account additional data points related to the networks of target users, based on the premise that people who are influential tend to have influential networks. The same five collective influence scores as outlined above for a single user can also be calculated for one's first-degree or X-degree connections. For example, the system may calculate: the collective influence of those to whom one's first-degree connections have been endorsed; the collective influence of people who have been endorsed to a target's first-degree connections; the collective influence of the people to whom one's first-degree connections have made recommendations, the collective influence of the people whom one's first-degree connections have endorsed, and the collective influence of those who have made recommendations to one's first-degree connections.

In some embodiments, network significance accounts for user attributes, such as level of seniority within an organization, organization size, relationship to searcher, and network behavior. Network behavior includes a variety of metrics that can be used to indicate influence, including frequency of user networking action and authenticity scores of endorsements made by a given user. In some embodiments, endorsement paths for a given user are analyzed to measure patterns and calculate additional metrics not directly related to network significance. In some embodiments, this involves designating a temporary memory location to store endorsement path information (as shown in FIG. 11). Other example endorsement path-based network significance metrics include: trajectory of endorsement paths (for example, if a card gets passed to higher user in terms of reputation or network significance as it goes), organizational hierarchy of endorsement path members, endorsement speed, number of times users pass on multiple cards, length of endorsement paths, number of endorsement paths. Many network significance metrics are based on the premises that influential people tend to be recommended to a wider range of people and that recipients of said recommendations are more likely to recommend influential people again. In other words, more and longer endorsement paths indicate greater influence because it shows that users think a target user is relevant and worth recommending to a broader group of people.

Other network behavior-based network significance metrics are derived from premises about what sort of people are considered to have influence. For example, people who are frequently recommended to others and who are frequently given electronic business cards are typically considered to have high influence. There are a number of other assumptions that are helpful in measuring influence based on user behavior: users who are the receiving user for a large number of endorsements tend to be influential; users who receive a large number of endorsements but do not make many are more influential than those who receive a large number and make a large number of endorsements; users who make recommendations that are then passed on by recipients tend to be more influential than those whose recommendations are not passed on; users who are the target of a large number of endorsements tend to be influential; users who make endorsements to people with high influence tend to be influential; users who are endorsed to people with high influence tend to be influential; users who endorse people with high influence tend to be influential. There are two exceptions to these assumptions: people who are not active on the platform may have artificially low rates of sending endorsements, and people who are overly active on the platform. The latter may be thought of as spammers who send far more endorsements than justified in order to game the system. Spammers may be identified by their tendency to frequently share cards with multiple users at a time or by having low influence relative to their network activity. Spammers may be identified also by creating a behavior profile of a user's activity, discovering clusters of similar users with statistical modeling, constructing normative behavior profile of similar users, and comparing and scoring similarity between user activity and normative activity to identify unusual network behavior.

A number of objective measures are stored that are used in conjunction with these assumptions to measure influence. These objective measures may include: Total endorsements received by target, percentage of endorsements received by target that are passed on to others, total endorsements sent by target, percentage of endorsements sent by target that are passed on to others, total endorsements of target sent by others, percentage of endorsements of target sent by others that are passed on again, total endorsements target user sent to people who have higher influence than target, total endorsements received by target user from people with higher influence than target.

Using these objective measures and the assumptions laid out above, measures of influence may be derived. In one embodiment, influence may be determined using the following ratios: (1) endorsements sent by target/endorsements received by target (ES/ER) (2) endorsements sent by target that are then passed on again/total endorsements sent by target (ESP/ES) (3) endorsements of target made to people with higher influence than sender/endorsements of target made to people with lower influence than sender (EOH/EOL) (4) endorsements of target that are then passed on again/total endorsements of target (EOP/EO).

Another user activity-based network significance metric is profile viewing behavior: in other words, tracking who has viewed a profile or electronic business card and how frequently. This includes looking at viewing behavior of people whose only connection to target user is having received an endorsement. This is based on the premise that recommendations that are followed up on by looking at the profile are given a higher weight.

Other network significance factors are derived from analyzing network behavior related to other cards besides personal trading cards. One method involves analyzing network behavior of request cards. This is based on the premise that users who have a high response rate on their requests tend to be influential. Another method involves analyzing projects to identify users who have played a role in one or multiple projects that were successful or unsuccessful, and using this to measure influence.

In some embodiments, network significance calculations account for an authenticity analysis of the present disclosure. The present disclosure includes improved systems and methods to determine the authenticity of the endorsements that underlie network significance scoring using social network analysis. In some embodiments, an authenticity analysis is performed when new networking data is input into the system, as shown in FIG. 13, which depicts virtual networking community 1310 sending networking data to authentication layer 1330, which generates an authenticity score and sends authenticated networking data to networking action database 1370. In some embodiments, authentication layer 1330 communicates with networking significance engine 1345 (this connection is not shown) and reputation engine 1340 (this connection is not shown) in order to request and receive network significance and reputation data to be used in authenticity analysis. In some embodiments, authentication layer 1330 includes calculating a network significance differential between a sending and receiving user in order to generate an authenticity probability score for each endorsement, which can be calculated by comparing the differential between two users to the average differential between similar users. In some embodiments, similar users are determined by identifying users with similar networking significance scores, but it should be understood that similarity can be determined based on identifying users who share other user attributes, such as occupying similar roles within an organizational hierarchy. In some embodiments, a number of similar users are identified and used as a sample set to determine average differential. In some embodiments, the average differential is compared to the differential for a given endorsement to determine an authenticity score. In some embodiments, a threshold is set above which endorsements are considered valid and in some embodiments the score is used in a raw form to determine network significance. In some embodiments, an authentication profile is created for a given endorsement to display details of how the two users relate and details about the authenticity score. In some embodiments, network significance engine 1345 retrieves authenticity data along with social networking action data and uses said authenticity data in computing network significance scores.

In some embodiments, the present disclosure includes a reputation engine (as shown in FIG. 13 as exemplary reputation engine 1340) that uses a plurality of network significance metrics, endorsement path data, and additional reputation metrics to calculate a general reputation score for a target user. The reputation score does not require a set number of the network significance influence metrics to exist, but is flexible in that it uses what is available. As shown in FIG. 13, reputation engine 1340 uses reputation rules 1355 to determine what data and what methods to use in calculating reputation. In some embodiments, users may edit the reputation rules. A reputation interface may be provided that displays some or all of the reputation metrics described above. A summary view may be provided and users may be provided the option to view more detailed breakdowns of said reputation information. Users may customize these views. General reputation scores may be updated automatically, whether at an interval of time or triggered by certain network behavior such as a new endorsement being received. If a user does not have a general reputation score, it is calculated when a threshold of network behavior is reached (such as a certain number of cards being collected).

In some embodiments, network significance is used to determine a reputation score for users directly. In other words, the reputation score for users is based entirely on the network significance factors outlined above. The present disclosure, however, also includes improved systems and methods for determining a reputation score that allows a user to adjust the composition of different reputation sub-metrics. In some embodiments, reputation sub-metrics include: project success, feedback, performance reviews, skills, experience, and/or organizational hierarchy.

In some embodiments, users are provided an interface to adjust the composition of the general network significance and reputation score. It should be understood that general reputation scores may by calculated in an ongoing manner or in response to discrete queries. In some embodiments, users are able to calculate reputation based on a flexible number of reputation metrics, wherein users adjust the relative weighting of all available metrics using a graphical user interface, wherein the graphical user interface includes a selection element and a breakdown element. In some embodiments, the selection element for each selected metric is a sliding switch, and in some embodiments the breakdown element is a chart, such as a pie chart. In some embodiments, business administrators are able to tweak the composition of the general reputation score in order to find the optimal formula. The disclosure includes improved systems and methods to use machine learning to monitor employee performance and reputation and to improve the computation in an ongoing manner. In some embodiments, firms are able to add their own or third-party HR data into the reputation interface, and can determine how to make use of that data with respect to the system's first-party data.

In some embodiments, the system's virtualization engine allows a network significance (and reputation) score to be established for a new user, wherein the reputation is based on cards the user has collected in real life and scanned into the system. Additionally, this allows the network significance reputation of anyone whose card the new user scans to be updated. In some embodiments, the system automatically calculates a reputation score for a new user at signup based on existing placeholder networking data, without requiring the new user to scan any business cards. This reputation score is based on the reputation scores of the users who have collected that new user's card offline, prior to the user signing up. The higher the reputation score of these users, the higher the initial reputation score for the new user. This is based on the premise that influential people tend to be endorsed to influential people.

Time-Specific Subnetwork Reputation

In addition to a general reputation score, the present disclosure includes improved methods to generate localized reputation scores for time-specific subnetworks, both in response to user inputs and according to preset queries, and to display customized scores and breakdowns of localized reputation scores to users. Localized reputation scores also involve changing the relative weighting of the components of the reputation score based on the specific subnetwork (the same reputation components that are used in the general reputation score are used in the localized reputation score). The present disclosure also includes improved systems and methods for providing users an interface to calculate customized reputation scores in response to a query, wherein the query gives the user granular control including selecting the population of users, time period, calculation of reputation sub-metrics, and composition of reputation score.

A time-specific subnetwork is defined by three parameters: a group of target users, a target population, and a period of time. In some embodiments, a time-specific subnetwork reputation score is calculated by analyzing network significance and other reputation metrics based on data drawn from within the time-specific subnetwork. The time-specific nature of the subnetwork allows the reputation score to be isolated to describe influence within a specific period. In one illustrative embodiment, a target user group could be defined as a group of software engineers who were tasked to work on a software project for a sales team. A localized score would allow a manager to see, for example, which of the engineers most frequently exchanged cards with or were recommended to sales team users (indicating a high degree of integration with the sales team), or which high-level sales team members had received recommendations of the engineers for inclusion on future projects. This example illustrates the power of being able to define a target population independently of target users: by defining the target population as high-level individuals, a localized reputation score can be computed reflecting only how that group of high-level individuals interacted with the target user group. Calculating a localized reputation score based solely on a specific time period conveys a specific advantage over just defining a subnetwork of users, because it isolates the score from being impacted by reputation information about the users beyond the scope of the project. In some embodiments, however, general reputation score of target users and target population may also be factored into a time-specific subnetwork reputation score. The disclosure includes another advantage over traditionally selecting a subnetwork, which is computing reputation using only data that pertains to other members of the network. For example, rather than counting all of the recommendations made by a user over the time period, it only considers those made visible to members of the subnetwork. Computing reputation using only data that pertains to other members of the subnetwork is faster and uses less memory than computing reputation using all data involving the relevant population.

Figure 16:
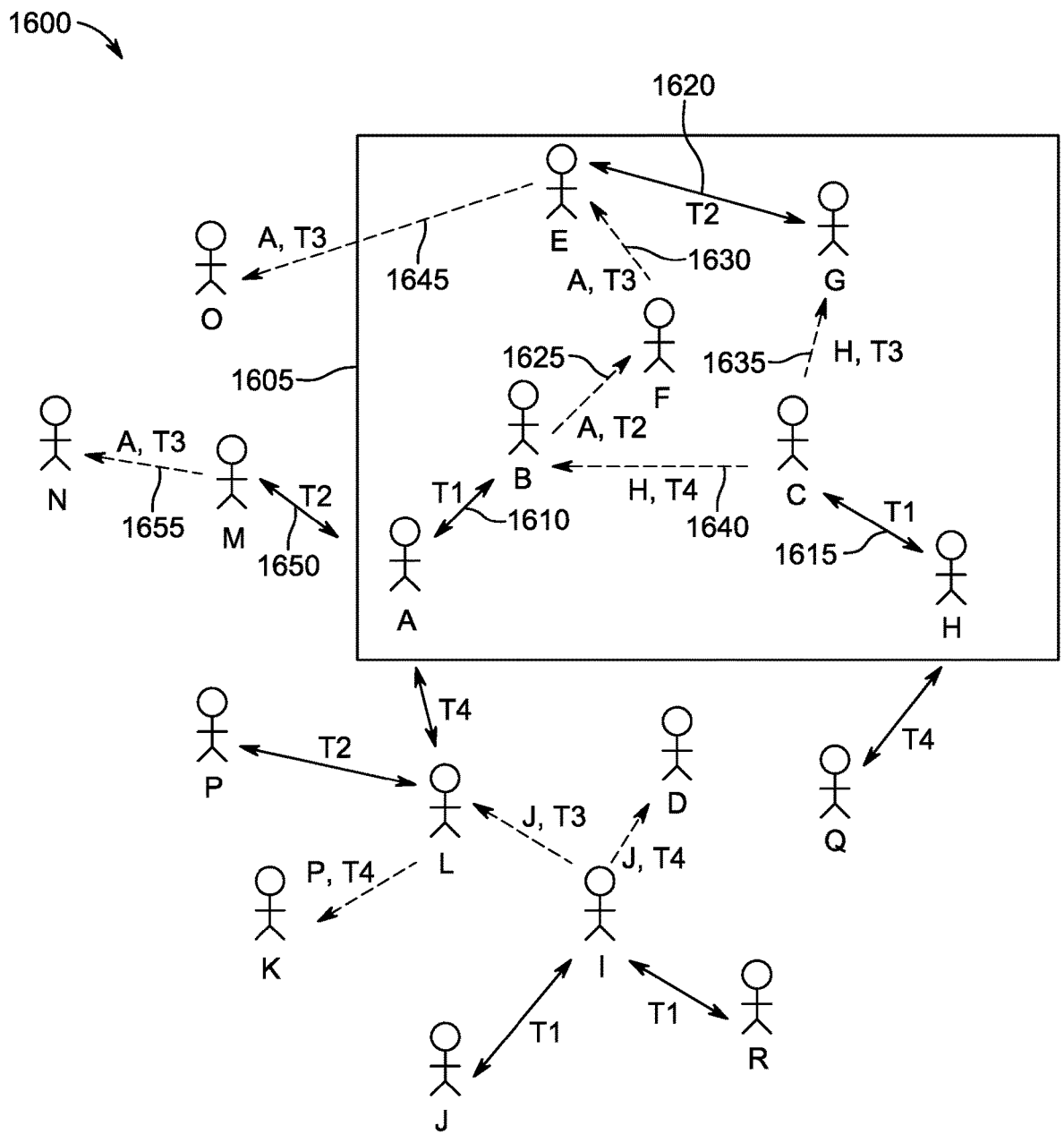
FIG. 16 shows an exemplary time-specific subnetwork.

FIG. 16 shows an illustrative representation of an exemplary networking environment with a specific time-specific subnetwork in accordance with some embodiments. In particular, FIG. 16 shows exemplary networking environment 1600, which illustrates how various parties interact from time T1 to time T4. As shown in FIG. 16, bilateral card trades (connections) are depicted as solid lines with arrows on both ends, and unilateral card transactions (endorsements) are depicted as dashed lines with an arrow pointing to the receiving user. Bilateral card trades are labeled with the time period in which the networking action took place and unilateral card trades are labeled with the time period as well as the user whose card is being passed on. As shown in FIG. 16, exemplary time-specific subnetwork 1605 is defined for a target user group consisting of users A and H; target population consisting of users B, C, E, F, and G; and time period T1 to T3. Time-specific subnetwork 1605 includes networking actions taken between members of the target user group and target population, which in FIG. 16 includes bilateral trade 1610, bilateral trade 1615, bilateral trade 1620, unilateral trade 1625, unilateral trade 1630, unilateral trade 1635. Time-specific subnetwork 1605 also includes networking actions taken by members of the target user group or target population that involve members of the target user group, which in FIG. 16 includes unilateral trade 1645 (since user E is forwarding user A's card to user O, this transaction is relevant for calculating user A's reputation within the time-specific subnetwork) and bilateral trade 1650 (since user A is making a bilateral exchange with user M during the time period, this is relevant for calculating user A's time-specific subnetwork reputation score, even though user M is not considered a member of the sub-network). Time-specific subnetwork 1605 does not include unilateral trade 1640, since this networking action occurred outside of the defined time period. It should be noted that unilateral trade 1655 is not included in time-specific sub-network 1605 because it is an action taken by a non-member of the subnetwork. In some embodiments, the definition of a subnetwork can be expanded to include all endorsement paths initiated by members of the sub-network (in which cases endorsement path 1655 would be included). It is understood that the networking data included in time-specific subnetwork 1605 is shown as an example, and that the systems and methods for calculating time-specific subnetwork reputation scores are not limited to networking data that includes endorsements and connections.

Figure 17:
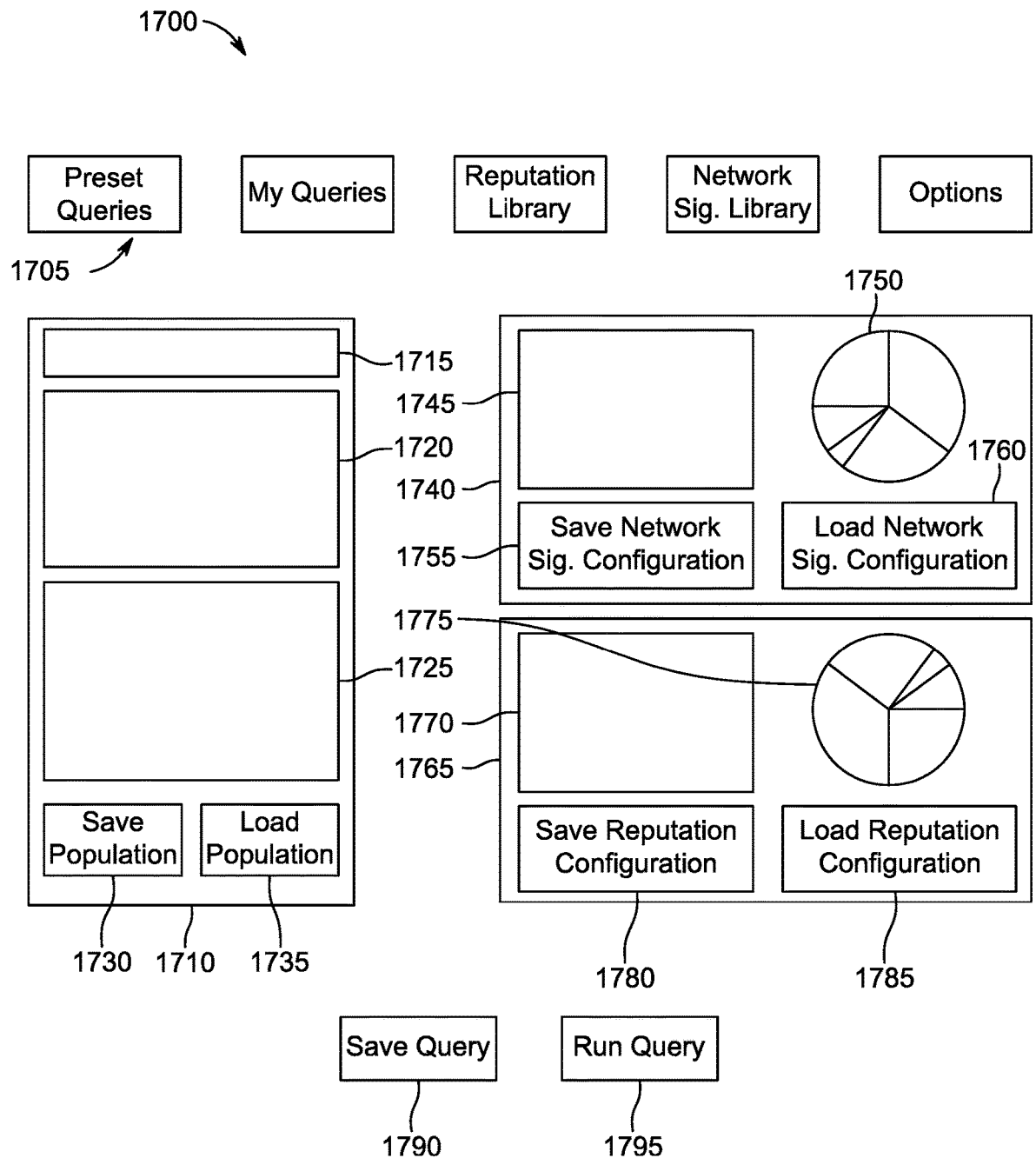
FIG. 17 shows an exemplary interface for a time-specific subnetwork reputation query.

In some embodiments, users are provided an interface to calculate customized reputation scores in response to a query. FIG. 17 shows an illustrative representation of an exemplary time-specific subnetwork reputation query interface in accordance with some embodiments. In particular, FIG. 17 shows a detailed illustrative implementation of exemplary time-specific subnetwork reputation query interface 1700 in accordance with some embodiments. As shown in FIG. 17, exemplary time-specific subnetwork reputation query interface 1700 includes toolbar 1705 (which includes a preset query library button, a my saved query library button, a reputation library, a network significance library, and an options button); population selection display 1710, which includes population search bar 1715, target user group builder 1720, target population group builder 1725, save population button 1730, load population button 1735; network significance configuration display 1740, which includes network significance metric selection field 1745, network significance breakdown indicator 1750, save network significance configuration button 1755, and load network significance configuration button 1760; reputation configuration display 1765, which includes reputation metric selection field 1770, reputation breakdown indicator 1775, save reputation configuration button 1780, and load reputation configuration button 1785; save query button 1790; and run query button 1795.

In some embodiments, network significance metric selection field 1745 and reputation metric selection field 1770 include drag-and-drop capabilities in which a user can select elements from network significance library and the reputation library (both in toolbar 1705) and drag selected metrics into the field for inclusion in the network significance score or reputation score configuration. In some embodiments, population search 1715 allows users to search by name and attribute, such as to search for users who have the same job title or who are paid within a given range. In some embodiments, population search 1715 allows users to select groups of users at a time, for example all sales employees.

In some embodiments, population search 1715 includes additional filters such as time period or start date. In some embodiments, load population button 1735 gives the option to select from both user's saved population and preset populations (such as those designed at the firm-level by a given firm). In some embodiments, network significance metric selection field 1745 and reputation metric selection field 1770 display an indicator and sliding switch for each selected metric, wherein the sliding switch is used to determine the relative weight of a given metric. In some embodiments, network significance breakdown indicator 1750 and reputation breakdown indicator 1775 display pie charts that show a real-time visualization of how the reputation breakdown will change based on the network significance and reputation metrics selected, which allows users keep track of a plurality of metrics and their relative weights. In some preferred embodiments, the network significance score is used as a reputation metric. In some embodiments, firms are able to add their own or third-party HR data into the reputation interface, and can determine how to calculate that with respect to the system's first-party data. The reputation system also includes a method for integrating third party human resource data into a reputation score as well as APIs to allow other human resource programs to pull reputation score information from the system. This flexibility means that the present system can be used in addition to other software, either by taking data from other software as an input or by exporting reputation information for use with other software.

In some embodiments, if one user is selected for a given time-specific subnetwork, run query button 1795 loads a new window (or a popup results window) that displays the user's calculated localized reputation score for the time-specific subnetwork as well as a detailed breakdown of the components of the score. In some embodiments, if multiple target users are selected for a given time-specific subnetwork, run query button 1795 loads a new window that displays a ranking of the target users by the calculated localized reputation score, along with group-level metrics, information on the statistical relationship between the users (for example, average localized reputation score), and summary information for each user. In some embodiments, each user is displayed using an icon of his or her personal trading card and the icons can be clicked to either load the full profile or to load a detailed breakdown of the components of the localized reputation score.

In some embodiments, the preset queries library includes a variety of queries with preset population, network significance configuration, and reputation significance configuration that correspond to various business questions. These preset queries may be set up at the firm or generic templates available to all users. For example, a software team may weight network significance metrics less than project success metrics, whereas a sales team may care more about network significance, and thus a preset query could be created for each group. In some embodiments, a firm is able to set up a number of queries to run at a given interval, such as a monthly analysis of which users made the most new connections or which users were recommended to C-level executives. In some embodiments, reputation scores calculated within a business context may be adjusted based on the specific employee's role and experience. In some embodiments, the system includes monitoring employee performance to determine which reputation score composition of sub-metrics is the most predictive, including running tests to determine hypothetical combinations, including both tests based on rules-based algorithms and based on a machine learning engine that uses raw social networking action data and performance results to generate results.

In some embodiments, exemplary time-specific subnetwork reputation search interface 1700 also includes a method for comparing a localized score to a general reputation score, or to another localized score for a different subnetwork (for example comparing an analyst class to two different target populations would involve two different localized reputation scores). In one illustrative embodiment, a manager may compare a sales team member's localized reputation score for within the firm to the user's general reputation score for a public network. The differential between these two scores may be computed as a unique metric of how much value one's outside network holds. The disclosure also includes methods to compare a user's breakdown of localized reputation score or scores to other users. For example, that same manager may compare the differential between a user's internal and public scores to other users on the sales team, to determine who has relatively more influence with users outside the firm.

In one illustrative embodiment of the disclosure, preset queries may be provided for a compensation review. In this example, a searching user may first be given the option to define a user group based on users who are paid similarly (to compare relative performance based on pay) or based on members of a given team (for example, to compare relative performance of sales team members), and then may be provided a preset relative weighting of various reputation score components with the option to make adjustments manually (for example, the compensation-focused preset for a sales team may emphasize external network significance), and the user then may be provided a ranking of target group users based on the customized localized score, with options to explore a detailed breakdown of the score for each user or to analyze group-level metrics.

Computer Implementation

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

What is claimed is:

1. A method of generating a network significance score in a networking environment, comprising:
    storing a plurality of networking actions, wherein the networking actions include connections and wherein the networking actions further include endorsements which have a subject user, a sending user who sends the endorsement of the subject user, and at least one receiving user who receives the endorsement sent by the sending user;
    receiving a request to calculate the network significance score fora target user;
    analyzing the plurality of networking actions to identify endorsements in which the target user is the subject user;
    retrieving data on one or more receiving users for endorsements in which the target user is the subject user, wherein the retrieved data includes the network significance score of the one or more receiving users; and
    computing the network significance score for the target user based in part on analysis of the retrieved data on the one or more receiving users who have received endorsements in which the target user is the subject user.

2. The method of claim 1, further comprising:
    retrieving data on the sending user for endorsements in which the target user is the subject user, wherein the retrieved data includes the network significance score of the sending user;
    comparing the network significance score of the sending user and the network significance score of the receiving user to compute a differential network significance score for endorsements in which the target user is the subject user; and
    computing the network significance score for the target user based in part on analysis of the differential network significance score for endorsements in which the target user is the subject user.

3. The method of claim 1 wherein the data retrieved on the one or more receiving users for endorsements in which the target user is the subject user includes a reputation score of the one or more receiving users.

4. The method of claim 1 wherein the networking data is stored in a relational database.

5. The method of claim 1 wherein the networking data is stored in a graph database.

6. The method of claim 1 wherein the networking data is stored in an unstructured database.

7. The method of claim 1 wherein the networking data is stored in a blockchain database.

8. The method of claim 1 wherein the networking actions take place in an online social networking environment.

9. The method of claim 1 wherein the endorsements take the form of passing electronic business cards, wherein a pass of an electronic business card has a subject user who is the subject of the electronic business card, a sending user who sends the electronic business card of the subject user, and at least one receiving user who receives the electronic business card sent by the sending user.

10. The method of claim 1, further comprising:
    identifying endorsements in which the target user is the sending user;
    retrieving data on one or more receiving users for endorsements in which the target user is the sending user; and
    computing the network significance score for the target user based in part on analysis of the network significance score of the users who have been the receiving user of endorsements in which the target user is the sending user.

11. The method of claim 1, further comprising:
    identifying endorsements in which the target user is the sending user;
    retrieving data on the subject user for endorsements in which the target user is the sending user; and
    computing the network significance score for the target user based in part on analysis of the network significance score of the users who have been the subject user of endorsements in which the target user is the sending user.

12. The method of claim 1, further comprising:
    identifying endorsements in which the target user is the receiving user;
    retrieving data on the subject user for endorsements in which the target user is the receiving user; and
    computing the network significance score for the target user based in part on analysis of the network significance score of the users who have been the subject user of endorsements in which the target user is the receiving user.

13. The method of claim 1, further comprising:
    identifying endorsements in which the target user is the receiving user;
    retrieving data on the sending user for endorsements in which the target user is the receiving user; and
    computing the network significance score for the target user based in part on analysis of the network significance score of the users who have been the sending user of endorsements in which the target user is the receiving user.

14. The method of claim 1, further comprising:
    analyzing the plurality of networking actions involving the target user to generate endorsement paths which comprise a unique set of users who have received or sent endorsements of the target user to one another sequentially, the received or sent endorsements being endorsements in which the target user is the subject user; and
    computing the network significance score for the target user based in part on analysis of the generated endorsement paths.

15. The method of claim 14, further comprising:
computing the network significance score for the target user based in part on the length and number of the generated endorsement paths.

16. The method of claim 14, further comprising:
analyzing the generated endorsement paths to determine an endorsement path network significance score for each of the generated endorsement paths, wherein the endorsement path network significance score for each such endorsement path includes analyzing the network significance scores of the set of users that are part of said endorsement path; and
computing the network significance score for the target user based in part on the endorsement path network significance scores for the generated endorsement paths.

17. The method of claim 16 wherein the endorsement path network significance score includes analyzing the speed of the endorsements that comprise the generated endorsement paths.

18. The method of claim 16 wherein the endorsement path network significance score includes analyzing the networking behavior of the set of users that are part of the generated endorsement paths.

19. The method of claim 14, further comprising:
analyzing endorsement path diversity, wherein the endorsement path diversity includes analysis of how similar and closely related are the set of users that are part of an endorsement path; and
computing the network significance score for the target user based in part on the endorsement path diversity of the generated endorsement paths.

20. The method of claim 1, further comprising:
computing a reputation score for the target user based on an analysis of reputation metrics, wherein the reputation metrics include metrics derived from an analysis of target user network significance, wherein the target user network significance includes analysis of the recipients of endorsements in which the target user is the subject user.

21. The method of claim 20 wherein additional reputation metrics include one of: project success metrics for the target user, feedback metrics for the target user, performance review metrics for the target user, skills of the target user, experiences of the target user, and the location of the target user in an organizational hierarchy.

22. The method of claim 20, further comprising:
calculating and storing a plurality of reputation metrics for the target user; and
providing a graphical interface for users to create custom reputation score configurations by selecting which of the plurality of reputation metrics to include and adjusting the relative weight of the plurality of selected reputation metrics.

23. The method of claim 22, further comprising:
providing preset reputation configurations fora user to choose from.

24. The method of claim 23 wherein the preset reputation configurations may be provided as a default or generated and saved by users.

25. The method of claim 23 wherein the preset reputation configurations correspond to specific business inquiries.

26. The method of claim 22, further comprising:
providing a graphical interface for users to select a target group of users;
calculating a reputation score for each user in the target group of users; and
ranking the target group of users based on the calculated reputation scores.

27. The method of claim 26, further comprising:
providing a graphical interface for users to designate and calculate multiple reputation scores for each user in the target group of users and to compare rankings of the users in the target group of users based on the calculated multiple reputation scores.

28. The method of claim 1, further comprising:
storing contextual data along with networking actions, wherein the stored contextual data includes the network significance score of the sending user, the network significance score of the subject user, and the network significance score of the receiving user at the time of the transaction of the networking action; and
calculating the network significance score for the target user based in part on analysis of the stored contextual data of the networking actions involving the target user.

29. The method of claim 28 wherein the contextual data includes whether or not the sending user, the subject user, and the receiving user were connected at the time of the transaction of the networking action.

30. The method of claim 1 wherein the networking actions include virtual networking actions and virtual representations of real world networking actions.

31. The method of claim 1, further comprising:
generating a request to calculate the network significance score for a target user automatically at a given interval of time; and
generating a request to calculate the network significance score for a target user automatically based on trigger actions, wherein trigger actions include a new endorsement involving the target user being made.

32. The method of claim 1, further comprising:
storing a plurality of user profiles wherein the user profiles have an associated network significance score;
monitoring a social network to identify new connections and new endorsements; and
updating the network significance score of the subject user, the network significance score of the sending user, and the network significance score of the one or more receiving users using an analysis of the new connections and the new endorsements according to a set of network significance rules, wherein the set of network significance rules define metrics and methods for calculating the network significance scores.

33. A system comprising one or more processors and non-transitory memory that stores instructions for execution by the one or more processors, wherein when executed by the one or more processors the instructions cause the one or more processors to execute a method according to claim 1.

34. A non-transitory memory medium memory that stores instructions for execution by one or more processors, wherein when executed by the one or more processors the instructions cause the one or more processors to execute a method according to claim 1.

35. A method of generating a network significance score in a networking environment, comprising:
storing a plurality of networking actions, wherein the networking actions include connections and wherein the networking actions further include endorsements which have a subject user, a sending user who sends the endorsement of the subject user, and at least one receiving user who receives the endorsement sent by the sending user;
receiving a request to calculate the network significance score for a target user;

analyzing the plurality of networking actions to identify endorsements in which the target user is the subject user;

retrieving data on one or more receiving users for endorsements in which the target user is the subject user, wherein the retrieved data includes the network significance score of the one or more receiving users;

analyzing the plurality of networking actions involving the target user to generate endorsement paths which comprise a unique set of users who have received or sent endorsements of the target user to one another sequentially, the received or sent endorsements being endorsements in which the target user is the subject user; and computing the network significance score for the target user based in part on analysis of the retrieved data on the one or more receiving users who have received endorsements in which the target user is the subject user and based in part on analysis of the generated endorsement paths.

36. A system comprising one or more processors and non-transitory memory that stores instructions for execution by the one or more processors, wherein when executed by the one or more processors the instructions cause the one or more processors to execute a method according to claim 35.

37. A non-transitory memory medium memory that stores instructions for execution by one or more processors, wherein when executed by the one or more processors the instructions cause the one or more processors to execute a method according to claim 35.

* * * * *